United States Patent
Kentley-Klay

(10) Patent No.: US 11,393,238 B1
(45) Date of Patent: Jul. 19, 2022

(54) SAFETY CONTROL SYSTEM FOR VEHICLES WITH CHILD CAR SEATS

(71) Applicant: Zoox, Inc., Menlo Park, CA (US)

(72) Inventor: Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 155 days.

(21) Appl. No.: 15/838,041

(22) Filed: Dec. 11, 2017

(51) Int. Cl.
*G06V 40/10* (2022.01)
*G05D 1/00* (2006.01)
(Continued)

(52) U.S. Cl.
CPC ............ *G06V 40/103* (2022.01); *B60K 35/00* (2013.01); *B60W 30/025* (2013.01);
(Continued)

(58) Field of Classification Search
CPC ............ G06K 9/00369; B60W 30/025; B60W 30/182; B60W 40/08; B60W 2040/0881; B60W 30/08–0956; B60W 60/00; B60W 60/0016; B60W 60/0025; B60W 2540/01; B60W 2540/221; B60W 2540/223; B60W 2540/227; B60K 35/00; B60K 2370/152; G05D 1/0088; G05D 1/0214; G05D 2201/0212; G05D 2201/0213; G05D 1/00;
(Continued)

(56) References Cited

U.S. PATENT DOCUMENTS

| | | | | |
|---|---|---|---|---|
| 5,482,314 A | * | 1/1996 | Corrado | G01S 15/523 280/735 |
| 5,782,485 A | * | 7/1998 | Takeda | B60R 21/01536 280/735 |
| 6,804,595 B1 | * | 10/2004 | Quail | B60R 21/01516 180/237 |

(Continued)

FOREIGN PATENT DOCUMENTS

| | | | | |
|---|---|---|---|---|
| CN | 107031357 A | * | 8/2017 | |
| DE | 102005057807 A1 | * | 6/2007 | ....... B60R 21/01532 |

(Continued)

OTHER PUBLICATIONS

Horisawa, Kota et al. English Translation of JPH0834272A—Espacenet Patent Translate, Oct. 29, 2019 (Year: 2019).*

(Continued)

*Primary Examiner* — Jeffrey C Boomer
*Assistant Examiner* — Paul Allen
(74) *Attorney, Agent, or Firm* — Lee & Hayes, P.C.

(57) ABSTRACT

A system for controlling an operation of a vehicle when a passenger is secure in a child car seat can receive data from one or more sensors within a passenger compartment of the vehicle, analyze the data to determine that a passenger is secure in a child car seat within the vehicle, and cause the vehicle to switch from operating in a first mode of operation, such as a bidirectional mode, to a second mode of operation, such as a unidirectional mode. The system may determine a direction of travel for the vehicle based on a pose of the passenger within the vehicle. The system can cause the (Continued)

vehicle to improve the riding experience of the passenger, such as by outputting media content to the passenger or modifying the operational characteristics of the vehicle, for example, by rocking the vehicle from front to back and/or side to side.

20 Claims, 18 Drawing Sheets

(51) Int. Cl.
| | | |
|---|---|---|
| *B60W 40/08* | (2012.01) | |
| *G05D 1/02* | (2020.01) | |
| *B60W 30/182* | (2020.01) | |
| *B60K 35/00* | (2006.01) | |
| *B60W 30/02* | (2012.01) | |
| *B60W 60/00* | (2020.01) | |

(52) U.S. Cl.
CPC .......... *B60W 30/182* (2013.01); *B60W 40/08* (2013.01); *B60W 60/0016* (2020.02); *B60W 60/0025* (2020.02); *G05D 1/0088* (2013.01); *G05D 1/0214* (2013.01); *B60K 2370/152* (2019.05); *B60W 2040/0881* (2013.01); *B60W 2540/01* (2020.02); *B60W 2540/221* (2020.02); *B60W 2540/223* (2020.02); *B60W 2540/227* (2020.02); *G05D 2201/0213* (2013.01)

(58) Field of Classification Search
CPC ........ B60N 2/002; B60N 2/0224–0276; B60N 2/2857–2863; B60N 2/2869; B60N 2/3018; B60N 2/3052; B60N 2/933–943; B60N 2/143; B60N 2002/022; B60N 2/14–146; B61D 33/0085; B62D 15/0265; B62D 15/00; B60F 5/00; G08G 1/00; G01C 21/00; G06T 7/00; G06T 2207/30268
USPC ...................................................... 701/23–28
See application file for complete search history.

(56) References Cited

U.S. PATENT DOCUMENTS

| | | | | |
|---|---|---|---|---|
| 9,971,348 | B1 * | 5/2018 | Canavor | G01C 21/3617 |
| 2006/0215589 | A1 * | 9/2006 | Taborisskiy | H04N 7/141 |
| | | | | 370/310 |
| 2009/0234542 | A1 * | 9/2009 | Orlewski | B60N 2/002 |
| | | | | 701/45 |
| 2013/0021476 | A1 * | 1/2013 | Trummer | B60R 22/48 |
| | | | | 348/148 |
| 2014/0253313 | A1 * | 9/2014 | Schoenberg | B60N 2/28 |
| | | | | 340/457 |
| 2018/0126951 | A1 * | 5/2018 | Ricci | B60R 25/2018 |
| 2018/0194247 | A1 * | 7/2018 | Kim | B60N 2/14 |
| 2018/0201254 | A1 * | 7/2018 | Myers | B60G 17/017 |
| 2019/0146494 | A1 * | 5/2019 | Li | G05D 1/021 |
| | | | | 701/23 |
| 2019/0146495 | A1 * | 5/2019 | Yan | B60W 40/09 |
| | | | | 701/26 |
| 2020/0047770 | A1 * | 2/2020 | Ozawa | B60W 40/08 |
| 2020/0108700 | A1 * | 4/2020 | Flanigan | G02F 1/0121 |

FOREIGN PATENT DOCUMENTS

| | | | | | |
|---|---|---|---|---|---|
| DE | 102008028844 | A1 | * | 1/2009 | ....... B60R 21/01516 |
| JP | H0834272 | A | * | 2/1996 | ............... B60N 2/14 |
| JP | 2012128592 | A | * | 7/2012 | |

OTHER PUBLICATIONS

Bao Genhua—English Description of CN-107031357—A via Espacenet Patent Translate, retrieved Apr. 14, 2020 (Year: 2020).*
Marshall, Aarian. "Who's Ready to Put Their Kid on a Self-Driving School Bus?" WIRED, Nov. 1, 2017. https://www.wired.com/story/self-driving-school-bus/ (Year: 2017).*
Wikipedia—Child safety seat, captured via archive.org, Nov. 20, 2016 (Year: 2016).*
Henze Karsten—English description of DE-102005057807-A1 via Espacenet Patent Translate, retrieved Nov. 4, 2021. (Year: 2021).*
Staehlin Ulrich—English description of DE-102008028844-A1 via Espacenet Patent Translate, retrieved Nov. 4, 2021. (Year: 2021).*
Takahashi, Naoki—English description of JP-2012128592-A via Espacenet Patent Translate, retrieved Nov. 4, 2021. (Year: 2021).*

* cited by examiner

SAFETY CONTROL SYSTEM FOR VEHICLES WITH CHILD CAR SEATS

BACKGROUND

Manufacturers design vehicles with safety features in order to protect passengers. For instance, manufacturers have created safety features, such as seat belts and air bags, that help protect passengers if a vehicle gets into an accident. One major area of vehicle safety deals with protecting children in a vehicle. To protect children, manufacturers have created child car seats that are designed to keep children safe during an accident. Federal and local governments have created laws that specify riding requirements (e.g., rear facing, forward facing, etc.) for children that use child car seats when riding in vehicles. However, current vehicles function the same regardless off the presence or absence of child passengers.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
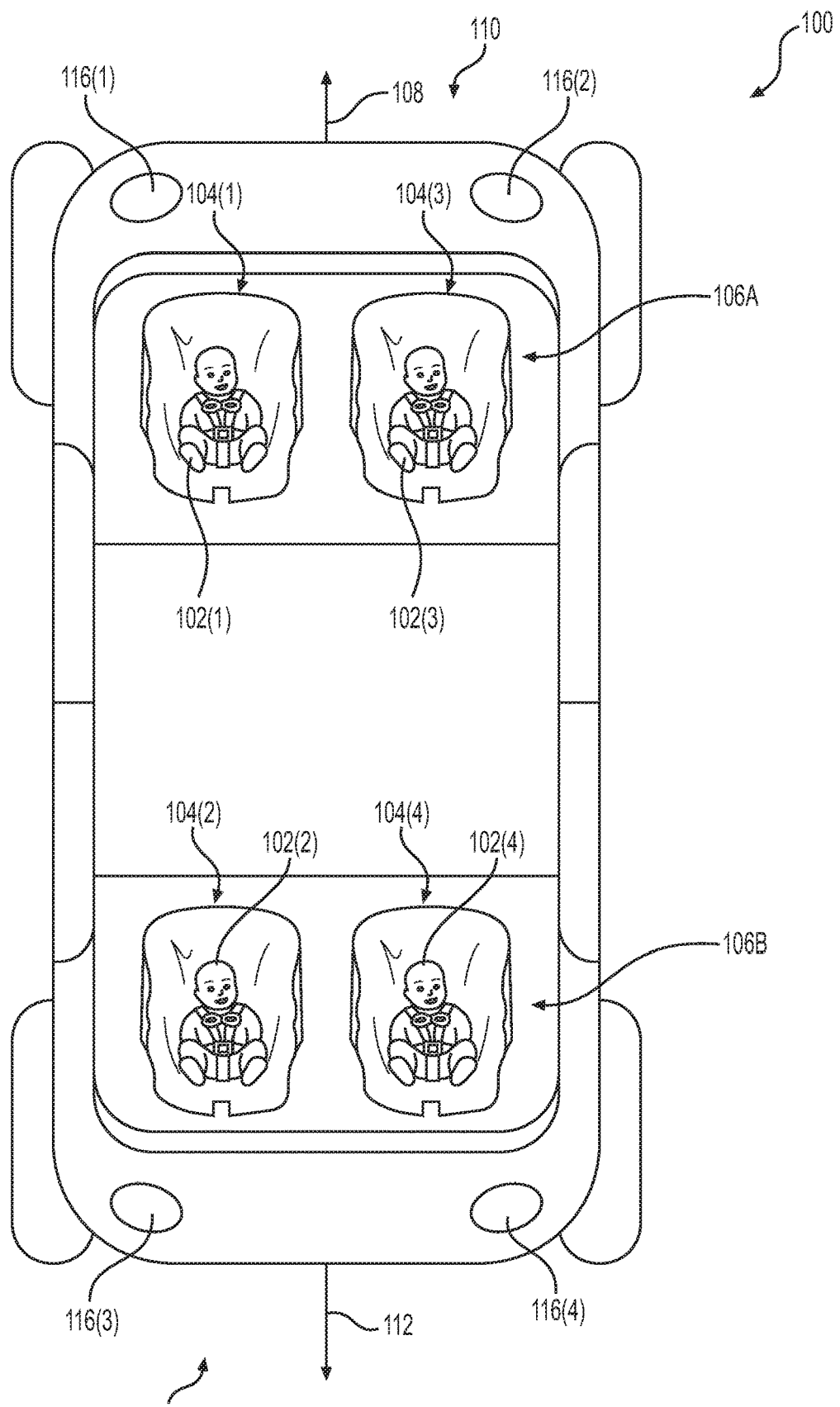
FIG. 1 is a schematic view of an example of passengers riding in child car seats in a vehicle.

As discussed above, manufacturers design vehicles with safety features in order to protect passengers. One major area of vehicle safety deals with protecting children in a vehicle. For instance, to protect children, manufacturers have created child car seats that are designed to keep children safe while riding in a vehicle. Current safety technologies focus on the design of vehicle restraints (e.g., set belts, car seat anchoring systems, etc.) and safety systems (e.g., airbags). However, operation of the vehicle is the same regardless of presence or absence of a child in a child car seat in the vehicle. Existing vehicles also do not determine whether child car seats are properly installed in the vehicle and/or whether children are properly secured in the child car seats.

This disclosure is generally directed vehicle systems that may be used when child passengers are present in a vehicle. For instance, a vehicle may include an autonomous vehicle or robot that is capable of bidirectional travel (i.e., equally capable of traveling in a first direction or a second direction opposite the first direction). In some examples, the vehicle may operate in a first mode of operation (e.g., a bidirectional mode of operation) when no child passengers are present in child car seats, and may operate in a second mode of operation (e.g., a unidirectional mode of operation) when one or more child passengers are present in one or more child car seats. In the first mode of operation, the vehicle may be configured to navigate in a first direction of travel, where a first end of the vehicle faces the first direction of travel, and a second direction of travel, where a second end of the vehicle faces the second direction of travel. In the second mode of operation, the vehicle may be limited to unidirectional travel (e.g., the first direction of travel or the second direction of travel). In some instances, the system causes the vehicle to operate in the first mode of operation or the second mode of operation based on whether there is a passenger within the vehicle that is in a child car seat and/or based on an orientation of a child car seat within the vehicle.

For instance, a user may utilize an electronic device to request the vehicle to perform a service. While navigating to a location of the user (e.g., a geographic location of the electronic device), a system may cause the vehicle to operate in the first mode of operation in which the vehicle can navigate in both the first direction of travel and the second directions of travel. After arriving at the location, the user (e.g., a parent or other adult) may secure a passenger (e.g., a child) in a child car seat. In some instances, the child car seat may already be secured within the vehicle before arriving at the location, while in other instances the user may provide and install the child car seat. In some examples, the child car seat may be integral with or part of the vehicle, while in other examples the child car seat may be separate from the vehicle, and the user may secure the child car seat within the vehicle using one or more restraints (e.g., seatbelts, anchors, latch systems, etc.). In either instance, the system may detect that the passenger is secure in the child car seat and, in response, may cause the vehicle to switch from operating in the first mode of operation to operating in the second mode of operation.

For instance, the vehicle may include one or more sensors (e.g., imaging devices, weight sensors, seatbelt sensors, etc.) that capture data (e.g., sensor data, such as image data, weight data, latch data, etc.) representing the passenger compartment of the vehicle. The system may receive the data from the vehicle and then analyze the data to detect that the passenger in the child car seat, that the child car seat is properly installed in the vehicle, and/or that the passenger is "properly" secured in the child car seat. Based on detecting one or more of these conditions, the system can cause the vehicle to operate in the second mode of operation in which the vehicle is configured to navigate in only the first direction of travel or only the second direction of travel.

In some instances, the system can further determine the direction of travel using the data. For instance, the system can analyze the data to determine one or more characteristics associated with the child car seat or the passenger, such as the location and orientation of the child car seat in the vehicle (e.g., front or rear seat and/or facing the front or rear of the vehicle), pose of the passenger (e.g., a location and orientation of the head of the passenger), the age of the passenger, the weight of the passenger, the height of the passenger, and/or the like. For example, the system can analyze the data to determine that the passenger is around the age of one. For another example, the vehicle can output audio that includes content requesting the age of the passenger, receive data representing user speech that indicates the age, and determine the age using the data. Additionally, or alternatively, in some instances, the system can determine the one or more characteristic based on receiving data from an electronic device. For example, the system can receive data from the electronic device of the user that indicates the age of the passenger.

The system can then use the one or more characteristics to determine the direction of travel. For instance, if the vehicle is operating in an area (e.g., county, state, country, etc.) that includes one or more laws, codes, or regulations specifying which way passengers within child car seats are to face when riding in vehicles, the system can select the direction of travel using the identified pose such that the child car seat and the passenger are oriented correctly within the vehicle (e.g., rear seat, rear-facing, front-facing, etc.).

In some instances, when operating in the second mode of operation, the system may cause the vehicle to navigate in a new direction of travel based on the one or more characteristics associated with the passenger changing. For instance, the child car seat may be secured to a mechanism, such as a swivel, that the system can use to rotate the child car seat from a first orientation within the vehicle to a second orientation within the vehicle. The system can then receive and analyze additional data to determine that at least one of the one or more characteristics, such as the pose of the passenger, has changed. In response, the system can determine a new direction of travel for the vehicle based on the changed characteristic. For example, the system can cause the vehicle to switch from navigating in the first direction of travel to navigating in the second direction of travel when the pose of the passenger switches from facing a first direction within the vehicle to facing a second, different direction within the vehicle.

In some instances, the system may cause the child car seat to rotate based on the vehicle changing directions of travel. For instance, the system may cause the vehicle to change from navigating in the first direction of travel to the second direction of travel. In response, the system may further cause the child car seat to rotate from a first orientation within the vehicle to a second orientation within the vehicle so that the child car seat continues to be positioned in the proper orientation after the change in direction of travel of the vehicle. In some instances, the system determines the first orientation for the child car seat based on the vehicle navigating in the first direction of travel and determines the second orientation for the child car seat based on the vehicle navigating in the second direction of travel.

In some instances, the system may restrict the locations in which the vehicle can operate when a child passenger is secure in a child car seat. For example, the system can receive data from the electronic device of the user (e.g., a parent or other adult) that indicates locations in which the vehicle is authorized to navigate. For instance, the data can indicate a given area (e.g., a square block, a county, a city, etc.), roads, a given location (e.g., such as to park the vehicle), and/or the like. For another example, the system can automatically determine the locations in which the vehicle is authorized to operate based on a geographical location of the electronic device of the user. For instance, the system can receive data from the electronic device that indicates the geographical location. The system can then restrict the locations in which the vehicle is authorized to operate to include locations that are within a threshold distance from the geographical location (e.g., within a mile, two miles, ten miles, etc.), or that are within a geofenced area defined by the electronic device (e.g., within a city block, a park, a parking lot, etc.).

In some instances, the system can continue to monitor the passenger compartment of the vehicle and then change the operation of the vehicle based on an occurrence of one or more events. For instance, the system may continuously receive data representing the passenger compartment. The system can then analyze the data to identify an occurrence of an event, such as the passenger secure in the child car seat crying, ceasing crying, temperature within the passenger compartment being above or below a threshold range, vehicle in need of service, etc. In response, the system can cause the vehicle to perform a given operation. For example, the system may cause the vehicle to navigate to a given location (e.g., using an alternative trajectory), which may include the location at which the passenger was picked up by the vehicle, a location of the user (e.g., parent or adult) that ordered the vehicle, a specified destination location, or the like. For another example, the system may cause the vehicle to output media content using one or more media devices. The media content can include music that is output by one or more speakers within the vehicle, a video that is presented using one or more displays within the vehicle, and/or the like. In some examples, the media (e.g., a song, play list, station, etc.) may be specified by and/or obtained from the electronic device of the user that ordered the vehicle. In other examples, the media may be determined and/or obtained by the vehicle directly.

In some instances, the system can further change the operation of the vehicle, while the passenger is secure in the child car seat, by limiting scheduled services for the vehicle. For example, the vehicle may be scheduled for a routine maintenance service at a given location when the passenger is secure in the child car seat within the vehicle. The system may thus determine, since the passenger is secure in the child car seat, to reschedule the routine maintenance service for the vehicle. For instance, the system may wait until the passengers exits the vehicle and, after the passenger exits the vehicle, cause the vehicle to navigate to the given location for the routine maintenance service.

In some instances, the system can improve the riding experience for passengers using one or more features of the vehicle. For instance, as discussed above, the system can cause the vehicle to output media content to the passenger within vehicle. The media content can include video content, such as a movie, that the vehicle presents using one or more displays located within the vehicle. The media content can also include audio content, such as music, that the vehicle outputs using one or more speakers located within the vehicle. In some instances, the system causes the vehicle to output the media content by sending the vehicle data associated with the media content, or causing the vehicle to obtain the content from a remote source (e.g., from a streaming audio and/or video service, by downloading or streaming content from the electronic device of the user, etc.). Additionally, or alternatively, in some instances, the vehicle may store the media content locally, and the system may causes the vehicle to output the media content by sending the vehicle messages that instruct the vehicle to output the media content.

In some instances, the system can further utilize one or more mechanisms associated with the vehicle to provide the passenger with motion within the vehicle. For example, the system can cause the suspension of the vehicle to "rock" the vehicle back-and-forth or side-to-side by repeatedly lifting a first end or side of the vehicle and dropping a second end or side of the vehicle, followed by lifting the second end or side of the vehicle and dropping the first end or side of the vehicle. For another example, the child car seat may be coupled to a mechanism that can cause the child car seat to "rock" back-and-forth and/or side-to-side, vibrate, rotate, and/or the like. In such an example, the system can cause the mechanism to "rock" the child car seat back-and-forth, vibrate, and/or rotate while the passenger is secure within the child car seat.

In some instances, the system can provide the user (e.g., parent or other adult) with the ability to control one or more operations of the vehicle. For example, the user can use the electronic device to select media content, and the system can cause the vehicle to output the selected media content to the passenger. For a second example, the user can use the electronic device to select a destination location for the vehicle, as well as a time period for when the vehicle is to arrive at the destination location, and the system can cause the vehicle to navigate to the destination location at the time period. For a third example, the user can use the electronic device to select one or more features, such as rocking the vehicle, vibrating the child car seat, and/or the like. In response, the system can cause the vehicle to perform the selected feature. For instance, system can cause the vehicle to "rock" back-and-forth using the suspension and/or hydraulics of the vehicle.

In some instances, the system can further provide the user with the ability to communicate with the passenger within the vehicle. For instance, the system may continuously receive data, such as image data representing the passenger compartment of the vehicle. The system can then send the data to the electronic device of the user so that the user can view the passenger compartment. Additionally or alternatively, the electronic device may transmit video of the user to the vehicle for display on a screen within the vehicle. While viewing the passenger compartment, the user can further use the electronic device to speak with the passenger within the vehicle. For instance, the electronic device may generate audio data representing user speech from the user and send the audio data to the system. In response, the system can send the audio data to the vehicle, where the sending causes the one or more speakers within the vehicle to output audible content representing the user speech. Thus, the system may enable one-way communication to allow the user to monitor the passenger compartment of the vehicle or two-way communication to allow the user to conduct a video conference with the passenger. In some instances, the system may also enable a remote monitoring service (e.g., a teleoperations service) to monitor the passenger compartment of the vehicle when there is a passenger installed in a child seat in the vehicle.

The techniques above describe a context of using a driverless autonomous vehicle. In some instances, such a vehicle can include a level 5 "fully autonomous" type vehicle in which passengers within the vehicle include passive passengers. Additionally, or alternatively, in some instances, such a vehicle may include a different level of vehicle, such as a level 0, level 1, level 2, level 3, level 4, or any other level that can be designated, or in the future is designated, to a vehicle. Additionally, the vehicle can include a passenger vehicle (e.g., personal vehicle such as a car, truck, or van; a for hire vehicle such as a taxi or a shuttle; and a public vehicle such as a bus, a passenger train, etc. Certain techniques may also be applicable to non-passenger vehicles (e.g., freight trucks, delivery trucks, semi-trucks, freight trains, agricultural equipment, etc.). Also, while described in the context of ground vehicles, techniques according to this application are also applicable to aerial and marine vehicles.

Additionally, by way of example and not limitation, the term "system," as used herein, may include a system built within the vehicle, a system that can be retrofitted into the vehicle, a system that is remote from the vehicle, a combination of the foregoing, or any other type of system capable of controller one or more operations of the vehicle. As discussed further in the examples below, the system can include components such as, for example, imaging devices (e.g., cameras), accelerometers, GPS receivers, cellular and wireless transceivers, magnetometers, altimeters, compasses, LIDARs, radars, ultrasonic transducers, gyroscopes, weight sensors, and other equipment, which can be used to compile and send data. The imaging devices can include, but are not limited to, low- and high-resolution digital still and/or video cameras, stereoscopic cameras—which may be capable of providing ranging information—and vehicle camera arrays (e.g., parking cameras) with multiple views.

It should further be noted that the description above describes the system analyzing data. In some instances, the system may analyze the data using one or more models, methods, and/or algorithms. For example, if the data includes image data representing the passenger compartment of the vehicle, the system may analyze the image data using one or more computer-vision models, methods, and/or algorithms associated with pose estimation to detect the three-dimensional location and orientation of the head and/or body of the passenger, a child car seat, or the like. For another example, if the data include audio data representing sound that is captured within the passenger compartment of the vehicle, the system can analyze the audio data using one or more models, methods, and/or algorithms associated with speech recognition to determine that the passenger within the vehicle is crying.

Additionally, or alternatively, in some instances, the system may send the data to a teleoperator for analysis. For example, based on a passenger within the vehicle being secure in child car seat, the system may continuously send data received from the vehicle to an electronic device associated with the teleoperator. The electronic device can receive the data and output media represented by the data to the teleoperator, such as a live audio and/or video feed of the passenger compartment. The teleoperator can then use the live video feed to determine the one or more characteristics associated with the passenger, whether an event is occurring within the vehicle, and/or the like.

These and other features are described below with reference to the figures, which are provided as illustrative examples.

FIG. 1 is a schematic top view of a vehicle 100 with a roof of the vehicle omitted for clarity. As shown in this example multiple child passengers 102(1)-(4) (also referred to individually as "passenger 102") are riding in respective child car seats 104(1)-(4) (also referred to individually as "child car seat 104") in one or more seating areas 106A and 106B in a passenger compartment of the vehicle 100. For instance, the vehicle 100 may include an autonomous vehicle that operates in at least a first mode of operation (e.g., a bidirectional mode of operation) and a second mode of operation (e.g., a unidirectional mode of operation). In the first mode of operation, the vehicle 100 may be configured to navigate in a first direction of travel 108, where a first end 110 of the vehicle 100 faces the first direction of travel 108, and a second direction of travel 112, where a second end 114 of the vehicle 100 faces the second direction of travel 112. For example, while navigating in the first direction of travel 108, light emitters 116(1)-(2) that are located on the first end 110 of the vehicle 100 may operate as headlights and light emitters 116(3)-(4) that are located on the second end 114 of the vehicle 100 may operate as taillights. Additionally, while navigating in the second direction of travel 112, the light emitters 116(3)-(4) located at the second end 114 of the vehicle 100 may operate as the headlights and the light emitters 116(1)-(2) that are located at the first end 110 of the vehicle 100 may operate as the taillights. While in this example, the passengers 102 are shown and described as being child passengers, in other examples, aspects of this disclosure may also be applicable to other passengers as well (e.g., adults, pets, etc.).

In the second mode of operation, the vehicle 100 may be limited to unidirectional travel, such that the vehicle can only be configured to navigate in the first direction of travel 108 or the second direction of travel 112. However, in some instances, while operating in the second mode of operation, the vehicle 100 may navigate in the opposite direction of travel to perform small maneuvers, such as reversing out of a parking spot or driveway. In some instances, a system causes the vehicle 100 to operate in the first mode of operation or the second mode of operation based on the passengers 102(1)-(4) within the vehicle being secure in the respective child car seats 104(1)-(4). In this example, four passengers 102(1)-(4) are illustrated in four child car seats 104(1)-(4), but in other examples the method may apply to scenarios involving any number of one or more passengers 102 secured in respective child car seat(s) 104.

Figure 2:
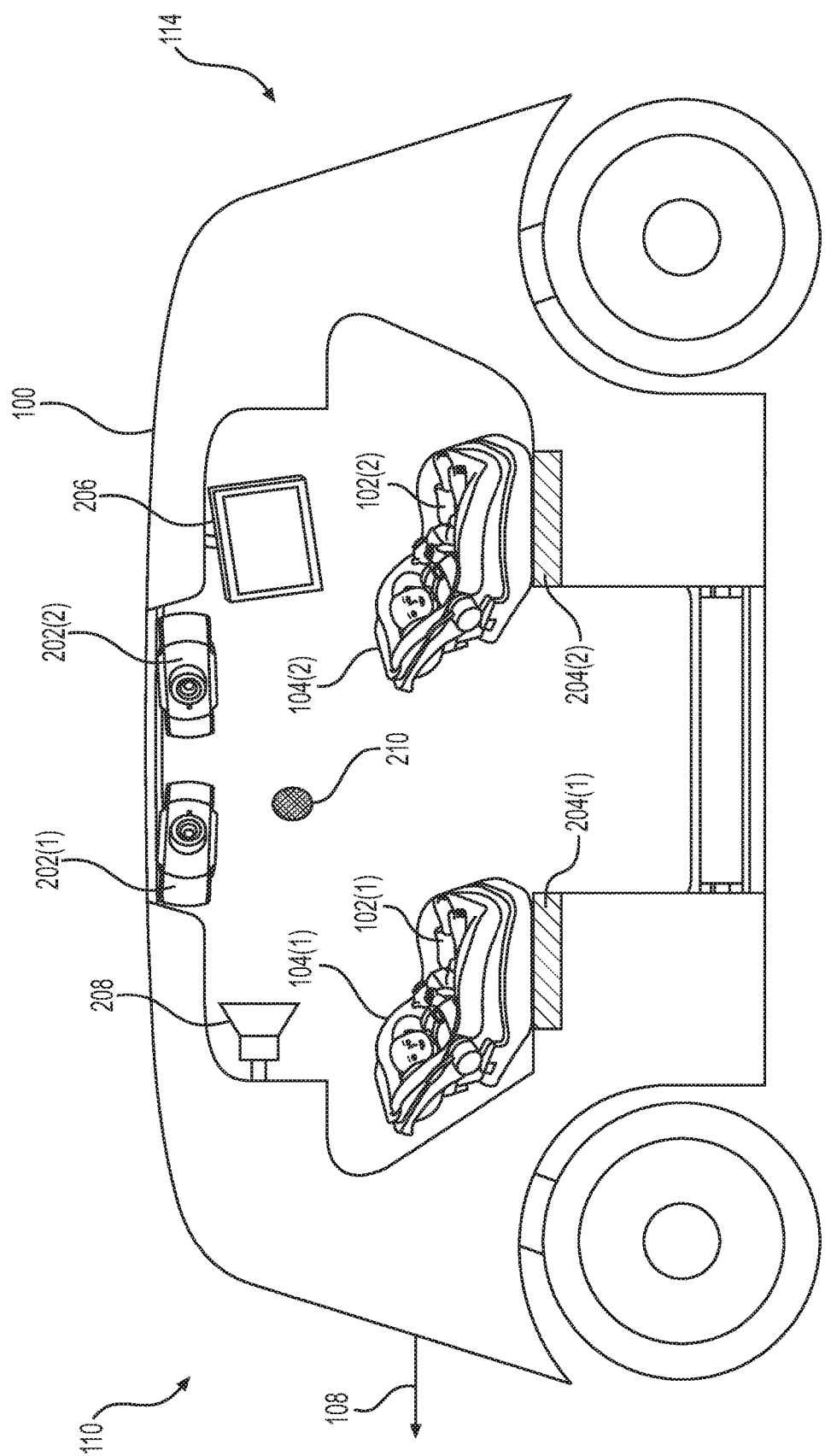
FIG. 2 is a schematic view of a system changing the operation of a vehicle when passengers are riding in child car seats.

FIG. 2 is a schematic side view of the vehicle 100 with a portion of the side wall of the vehicle 100 omitted for clarity. FIG. 2 illustrates aspects of a system that causes the vehicle 100 to switch modes of operation based on at least one of the passengers 102(1)-(2) in the vehicle 100 being secure in the respective child car seat 104(1)-(2). For instance, the vehicle 100 may include one or more sensors that capture data representing or otherwise indicating the presence or absence of passengers 102(1)-(2) within the vehicle 100. The one or more sensors can include, for example, imaging devices 202(1)-(2) (e.g., cameras) that capture image data representing the passenger compartment of the vehicle 100. The one or more sensors can further include, for example, weight sensors 204(1)-(2) that are located within the seats of the vehicle 100 and/or within the child car seats 104(1)-(2). Additionally, the one or more sensors may include, for example, sensors (not shown) that are located within, coupled to, or otherwise associated with seat belts (lap and/or shoulder belts), seat belt tensioners, car seat anchors, car seat latch systems, armrests, headrests, or other components within the vehicle 100 and/or the seat belts of the child car seats 104(1)-(2) that capture data indicating whether the child car seats are properly installed and/or the seat belts are properly fastened.

The system may receive the data from the vehicle 100 and, in response, analyze the data to detect that the passengers 102(1)-(2) are secure within the child car seats 104(1)-(2). For example, the system can analyze the image data to determine if the image data represents at least the passengers 102(1)-(2) in child car seats 104(1)-(2), that the child car seats are positioned in the seating area 106 in an expected position and orientation, that the seat belts are positioned on/over/through the child car seat at an expected location, or other visual indications that the child car seats are properly secured in the vehicle and/or that the passengers are properly secured in the child car seats. Additionally or alternatively, the system can analyze the data captured by the weight sensors 204(1)-(2) to determine that passengers 102(1)-(2) are secure in the child car seats 104(1)-(2). In some instances, the system determines that the passengers 102(1)-(2) are secure in the child car seats 104(1)-(2) based on the data indicating a threshold amount of weight (e.g., five pounds, ten pounds, thirty pounds, etc.) is being applied to the child car seats 104(1)-(2). Additionally or alternatively, the system may determine that the passengers 102(1)-(2) are secure in the child car seats 104(1)-(2) based on seat belt sensors indicating that the seatbelts are extended an expected distance to strap in a child car seat and/or that the seat belt mechanism is latched.

Additionally, or alternatively, a teleoperator system (illustrated in FIG. 11) can be used to determine if the passengers 102(1)-(2) are secure in the child car seats 104(1)-(2). For instance, the teleoperator system can receive at least a portion of the data from the vehicle 100. A teleoperator associated with the teleoperator system may then use the data to view the interior passenger compartment of the vehicle 100, such as by using a display. While viewing the interior passenger compartment of the vehicle 100, the teleoperator may determine that the passengers 102(1)-(2) are secure in the child car seats 104(1)-(2). Additionally, the teleoperator may determine that the child car seats 104(1)-(2) are positioned in the seating area 106 in an expected position and orientation, and that the seat belts are positioned on/over/through the child car seat at an expected location.

Each of these techniques, as well other techniques, can be used to determine if a child car seat is properly secured in the vehicle. Based on detecting that the passengers 102(1)-(2) are secure in the child car seats 104(1)-(2), the system can cause the vehicle 100 to operate in the second mode of operation.

In some instances, the system can determine a direction of travel for navigating the vehicle 100 when the vehicle 100 operates in the second mode of operation. For instance, the system can analyze the data to determine one or more characteristics associated with each passenger 102(1)-(2), such as the pose of the respective passenger 102(1)-(2) (e.g., location and orientation of the head and/or body of the passenger), the age of the respective passenger 102(1)-(2), the weight of the respective passenger 102(1)-(2), the height of the respective passenger 102(1)-(2), and/or the like. The system can then use the one or more characteristics to determine the direction of travel. For instance, if the vehicle 100 is operating in an area (e.g., county, state, country, etc.) that includes one or more laws, codes, or regulations specifying which way passengers within child car seats are to face when riding in vehicles, the system can select the direction of travel such that the passengers 102(1)-(2) are oriented correctly within the vehicle.

For example, the system may determine that a law associated with the area that the vehicle 100 is operating requires that passengers under the age of one year must remain in rear-facing car seats when riding in vehicles. As such, to determine the direction of travel, the system may analyze the data to determine a respective pose of at least one of the passengers 102(1)-(2) (or an orientation of the child car seat) and a respective age of at least one of the passengers 102(1)-(2) (which may be determined as described above). The system can then determine the direction of travel based on the respective pose and the respective age. For instance, in the example of FIG. 2, the system may determine that, based on the respective pose of each of the passengers 102(1)-(2), each of the passengers 102(1)-(2) is facing the second end 114 of the vehicle 100. The system may further determine that each of the passengers 102(1)-(2) is younger than one year old. Therefore, based on the determined characteristics of the passengers 102(1)-(2), the system can determine that the vehicle 100 should navigate using the first direction of travel 108 so that each of the passengers 102(1)-(2) is rear-facing.

In some instances, in order to improve the safety of the passengers 102(1)-(2) within the vehicle 100, the system can further determine that the passengers 102(1)-(2) are "properly" secure in the child car seats 104(1)-(2) before navigating the vehicle 100. For instance, the system may analyze the data to determine that each of the child car seats 104(1)-(2) are properly secured in the vehicle and/or that each of the passengers 102(1)-(2) is properly secured within the respective child car seat 104(1)-(2). For example, the system can analyze the data from the sensors within the fasteners of the seat belts to determine that the seat belts are properly fastened.

In some instances, the system may suspend the operation of the vehicle 100 when a passenger 102 is not properly secured in a child car seat 104 and/or a child car seat 104 is not properly secured within the vehicle 100. For example, the system may cause the vehicle remain stationary in a current location until the passenger 102 is properly secured in the child car seat 104 and the child car seat 104 is properly secured in the vehicle 100. In some instances, the system may further cause the vehicle 100 to output a notification, such as audible and/or video content, indicating that the passenger 102 is not properly secured in the child car seat 104 and/or the child car seat 104 is not properly secured in the vehicle 100. In some examples, the notification may additionally or alternatively include an instruction or prompt the user how to properly secure the passenger in the child car seat and/or the child car seat in the vehicle.

Figure 4:
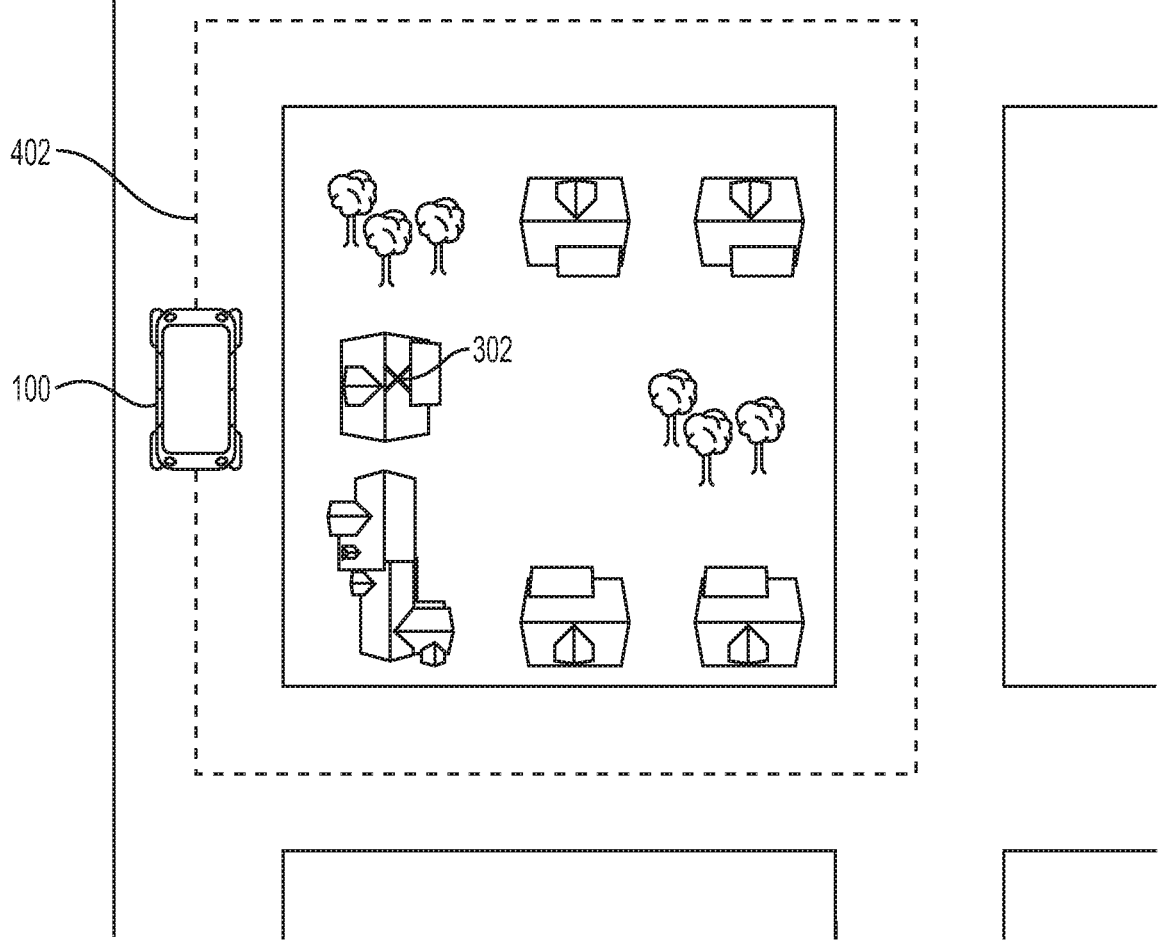
FIG. 4 is an example of restricting locations in which a vehicle can operate when a passenger is in a child car seat within the vehicle.

In some instances, and as discussed below with regard to FIG. 4, the system may restrict the locations in which the vehicle 100 can operate when the passengers 102(1)-(2) are secure in the child car seats 104(1)-(2). For instance, the system can receive data from an electronic device, such as the electronic device of the user that requested the vehicle 100, that indicates locations in which the vehicle 100 is authorized to navigate. For instance, the data can indicate a given area (e.g., a square block, a county, a city, etc.), one or more roads, a given location (e.g., such as a park or parking lot), a specified distance from the electronic device of the user, and/or the like. The system can then use the data to determine where the vehicle 100 is authorized to navigate while the passengers 102(1)-(2) remain in the child car seats 104((1)-(2).

Additionally, or alternatively, in some instances, the system can automatically determine the locations in which the vehicle 100 is authorized to operate. For example, the system may determine an area of operation for the vehicle, where the vehicle 100 must stay within the area of operation while the passengers 102(1)-(2) remain in the child car seats 104(1)-(2). The area of operation can include, for example, a threshold distance around the location at which the passengers 102(1)-(2) were picked up by the vehicle 100. The area of operation can further include, for example, the city block, county, city, and/or the like that includes the location where the passengers 102(1)-(2) were picked up by the vehicle 100. Additionally, in examples where the system received a request for the vehicle 100 from an electronic device of a user, the area of operation can include a threshold distance from the geographic location of the electronic device.

In the example of FIG. 2, the system can further provide media content to the passengers 102(1)-(2) within the vehicle 100. For instance, the system may cause the vehicle 100 to present visual content (e.g., images, videos, etc.) using at least one display 206 located within the vehicle 100. In some instances, in addition to or alternatively from the display 206, the system can use a projector to project to the content within the vehicle 100. Additionally, the system may cause the vehicle to present audio content (e.g., music, audio representing user speech, etc.) using at least one speaker 208 located within the vehicle. In some instances, the system causes the vehicle 100 to provide the media content by sending the vehicle 100 data representing the media content. Additionally, or alternatively, in some instances, the vehicle 100 may store media content locally, and the system causes the vehicle 100 to provide the media content by sending the vehicle 100 data indicating what media content to provide to the passengers 102(1)-(2).

In some instances, the system can select media content based on receiving input from a passenger within the vehicle 100 and/or a user outside of the vehicle 100. For instance, a passenger and/or a user can use an electronic device to send data to the system that indicates the media content to output in the vehicle 100. Additionally, or alternatively, in some instances, the system can select the media content using a profile of a passenger within the vehicle 100 and/or a user outside of the vehicle 100. For instance, the system may have received a request for the vehicle 100 from an electronic device of a user. The system can then use a profile of the user, which the system may store locally, to determine the media content to output within the vehicle 100.

In some instances, the system can monitor the passenger compartment of the vehicle 100 and then change the operation of the vehicle 100 based on the occurrence of one or more events. An event can include one of the passengers 102(1)-(2) crying, one of the passengers 102(1)-(2) making a mess within the vehicle 100, one of the passengers 102(1)-(2) requesting to be dropped off at a given location, and/or the like. Based on detecting the occurrence of the event, the system can change the operation of the vehicle 100. For example, the system can cause the vehicle 100 to navigate to a given location (e.g., using an alternative trajectory), such as the location in which the vehicle 100 picked up the passengers 102(1)-(2). For another example, the system can cause the vehicle 100 to output media content to the passengers 102(1)-(2).

For instance, the system may continuously receive data representing the passenger compartment, such as image data from the imaging device 202(1)-(2) and/or audio data representing sound within the vehicle 100 from at least one microphone 210. The system can then analyze the data to identify that one of the passengers 102(1)-(2) within the vehicle 100 is crying. For example, the system can analyze the image data to determine that the image data represents the first passenger 102(1) crying. For another example, the system can analyze the audio data to determine that the audio data represents sound associated with the first passenger 102(1) crying. Based on detecting the event, the system can cause the vehicle 100 to return to the location at which the vehicle 100 picked up the first passenger 102(1).

In some instances, the system may further provide a user outside of the vehicle 100 with the ability to communicate with the passengers 102(1)-(2). For instance, the system may continuously receive the data from the vehicle, such as the video data and the audio data, and send the data to an electronic device of a user (e.g., the user that requested the vehicle). The user can then use the electronic device view the passenger compartment of the vehicle 100. Additionally, the user can use the electronic device to communicate with the passengers 102(1)-(2). For instance, the electronic device may generate data, such as video data representing the user and/or audio data representing user speech from the user. The electronic device can then send the data to the system. In response, the system can send the data to the vehicle to be output by the at least one display 206 and/or the at least one speaker 208.

In some instances, the system can determine a pose of a passenger 102 as the three-dimensional location and orientation of the head of the passenger 102 with respect to the passenger compartment of the vehicle 100. Additionally, or alternatively, in some instances, the system can determine a pose of a passenger 102 as the three-dimensional location and orientation of the head of the passenger 102 with respect to the child car seat 104 of the passenger 102. For instance, system can analyze the data to determine that a child car seat 104 is either facing a seat within the vehicle 100 or facing away from the seat within the vehicle 100. Based on the determination, the system can determine the pose of the passenger 102 within the vehicle 100 (e.g., either the passenger 102 is facing the seat for facing away from the seat).

Figure 3A:
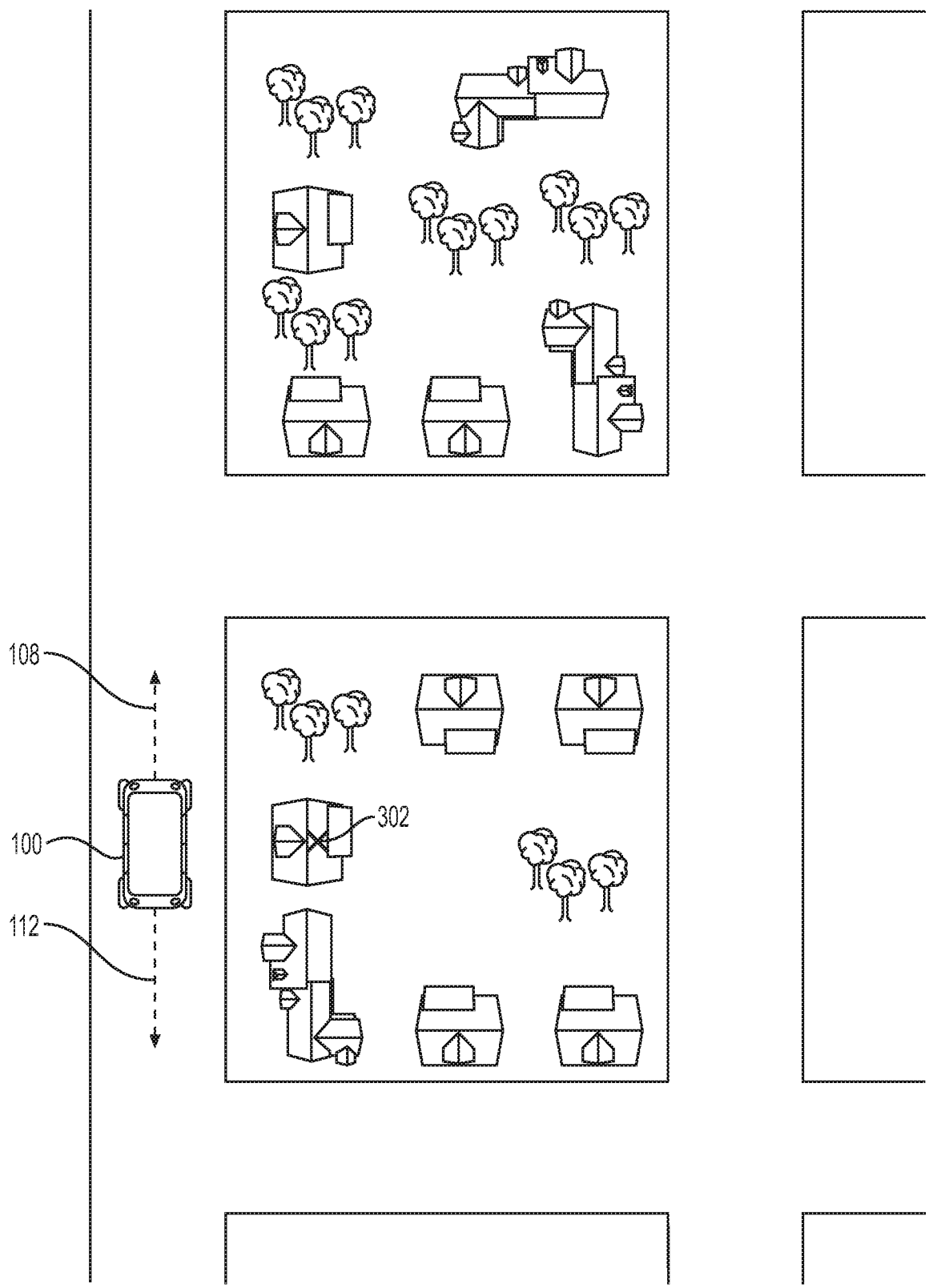
FIG. 3A is an example of a vehicle operating in a bidirectional mode without a passenger in a child car seat.
Figure 3B:
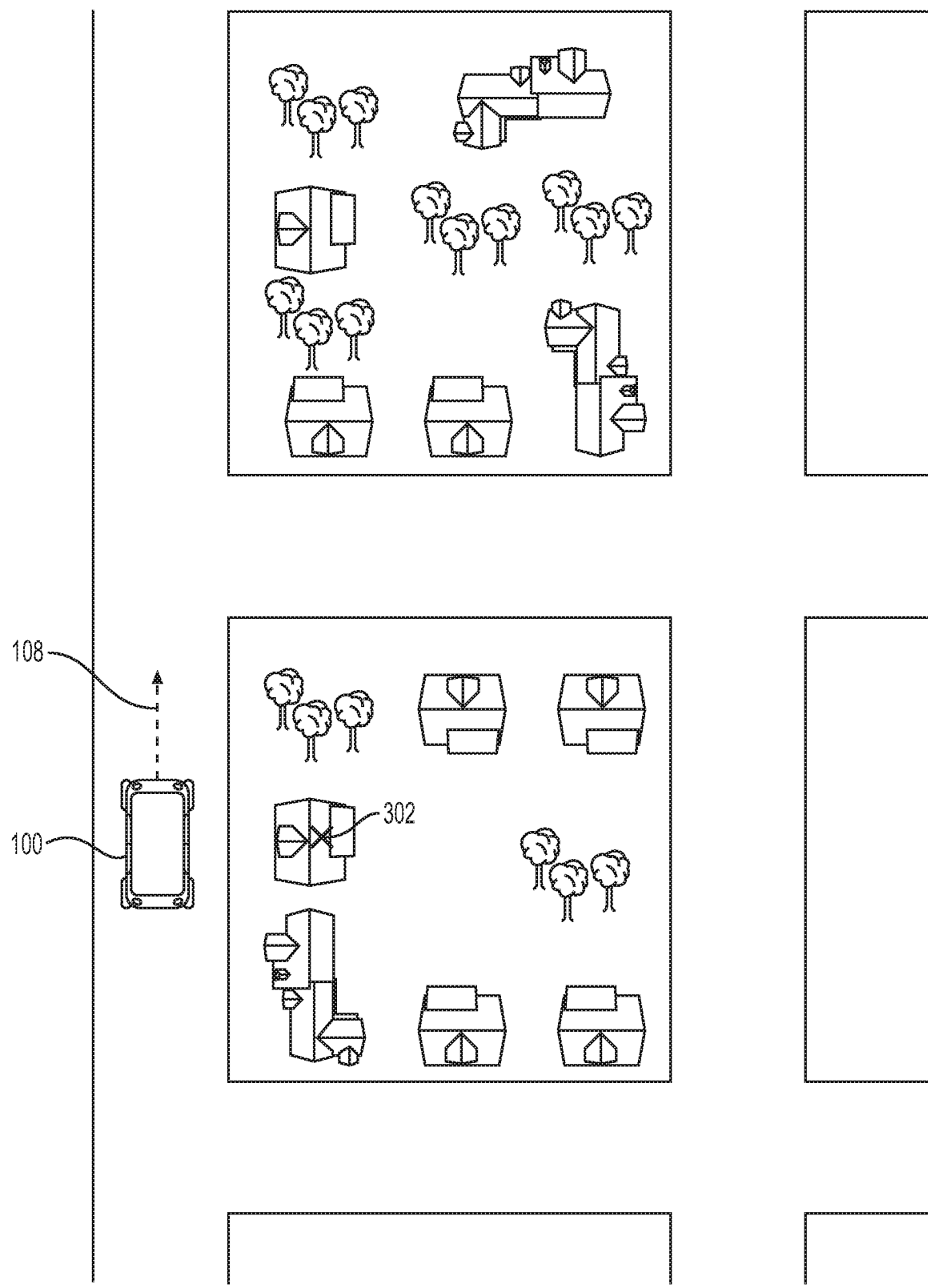
FIG. 3B is an example of the vehicle operating in a unidirectional mode with a passenger in a child car seat.

FIGS. 3A-3B illustrate an example of the vehicle 100 switching from a first mode of operation to a second mode of operation. For instance, in the example of FIGS. 3A-3B, a user may use an electronic device to send, to the system, a request for a vehicle. In some instances, the request can include a location 302 for sending the vehicle, such as a geographic location of the electronic device and/or a geographic location of where to pick up one or more passengers. In some instances, the request can further include passenger data, such as the number of passengers that are getting picked up, ages of each of the passengers, whether a passenger requires a child car seat, and/or the like. In response, the system can cause the vehicle 100 to navigate to the location 302. While navigating to the location 302, the vehicle 100 may be operating in a first mode of operation. For instance, the vehicle 100 may be capable of navigating in the first direction of travel 108 and the second direction of travel 112.

Once the vehicle 100 arrives at the location 302, the user may secure at least one passenger in a child car seat within the vehicle 100. The system may then begin receiving data representing the passenger compartment of the vehicle 100. For instance, the system may receive image data representing the passenger secure in the child car seat within the vehicle 100. The system can further analyze the data to determine that the passenger is secure in the child car seat. In response, and as illustrated in FIG. 3B, the system can cause the vehicle to switch from operating in the first mode of operation to operating in the second mode of operation. As shown, in the second mode of operation, the vehicle 100 is only configured to navigate in a single direction of travel, such as the first direction of travel 108.

In some instances, such as when the user secures the child car seat in the vehicle 100 (e.g., the child car seat is not part of the vehicle 100), the system can determine the direction of travel. For instance, the system can analyze the data to determine the pose of the passenger within the vehicle 100. The system can further determine, based on one or more laws, codes, or regulations associated with the area that the vehicle 100 is operating and/or characteristics associated with the passenger (e.g., age, height, weight, etc.), which direction the passenger should be facing within the vehicle 100. The system can then determine the direction of travel, using the pose, such that the passenger is facing the correct direction within the vehicle 100.

In some instances, the system can further determine locations that the vehicle 100 is authorized to operate while the passenger is secure in the child car seat. For example, as illustrated in FIG. 4, the system may determine that the vehicle 100 is authorized to operate along locations 402. In some instances, the system can determine the locations 402 based on the locations 402 being within a threshold distance to the pickup location 302 of the passenger. In some instances, the system can determine the locations 402 based on the locations 402 being within a threshold distance to the electronic device that sent the request for the vehicle 100. In some instances, the threshold distance may be set by the system. Additionally, or alternatively, in some instances, the system may receive data from the electronic device that indicates the threshold distance and/or a particular path or route for the vehicle to travel.

Figure 5:
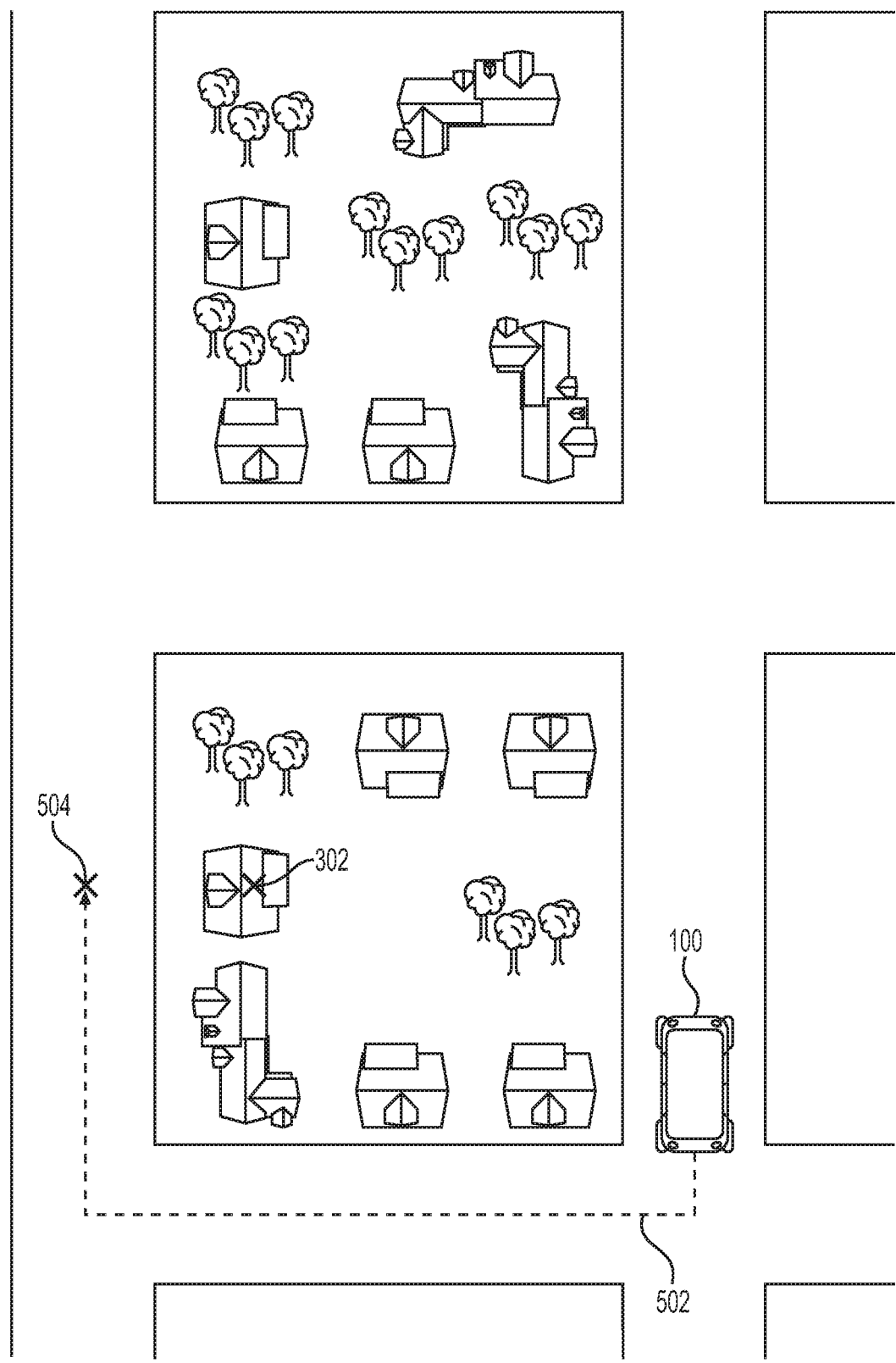
FIG. 5 is an example of causing a vehicle to navigate to a given location based on an occurrence of an event.

In some instances, while the vehicle 100 is navigating with the passenger in the child car seat, the system may determine that an event has occurred. For instance, in the example of FIG. 5, the system may continuously monitor the passenger compartment of the vehicle 100 using data received from the vehicle 100. To monitor the passenger compartment, the system can analyze the data to determine when an event occurs. For instance, while analyzing the data, the system may determine that the passenger secure in the child car seat has started crying. In some instances, the system may determine that the child is crying for a threshold period of time (e.g., ten seconds, one minute, etc.). Based on determining that the passenger is crying, the system may cause the vehicle 100 to navigate along an alternative trajectory 502 to a given location 504.

In some instances, the location 504 may include the location that the vehicle 100 picked up the passenger. Additionally, or alternatively, in some instances, the system may determine the location 504 based on the geographic location of the electronic device that requested the vehicle 100. For instance, the system may receive data from the electronic device that indicates the geographic location. The system may then determine the location 504 based on the location 504 being as close the geographic location of the electronic device that the vehicle 100 is able to operate (e.g., the closest road). Additionally, or alternatively, in some instances, the system may receive data from the electronic device that indicates the location 504. For instance, when making the request, the user may specify that the vehicle 100 is to navigate to the location 504 if the event occurs.

Figure 6A:
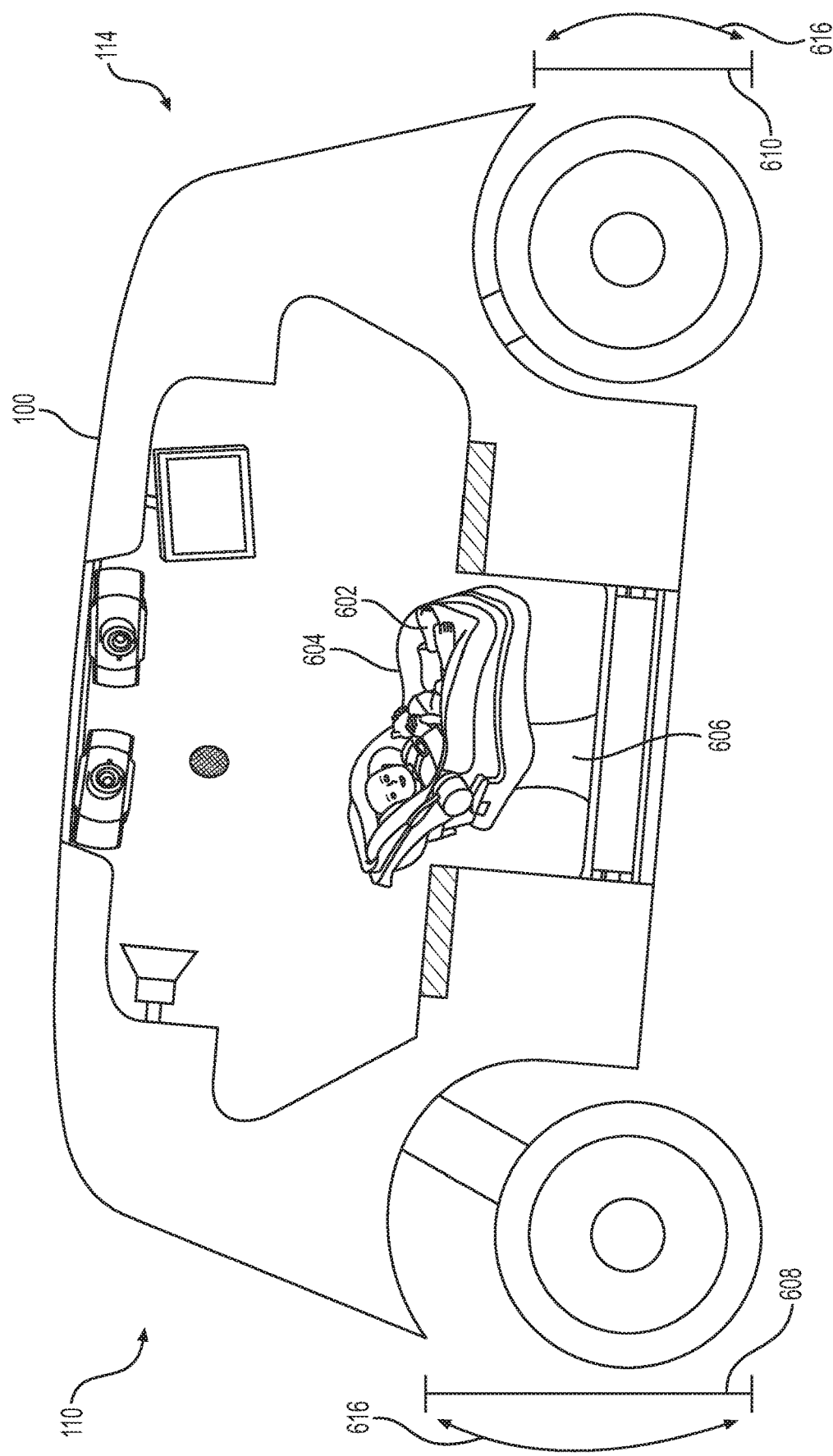
FIG. 6A is a first example of a vehicle using suspension to cause a child car seat to "rock" back-and-forth within the vehicle.
Figure 6B:
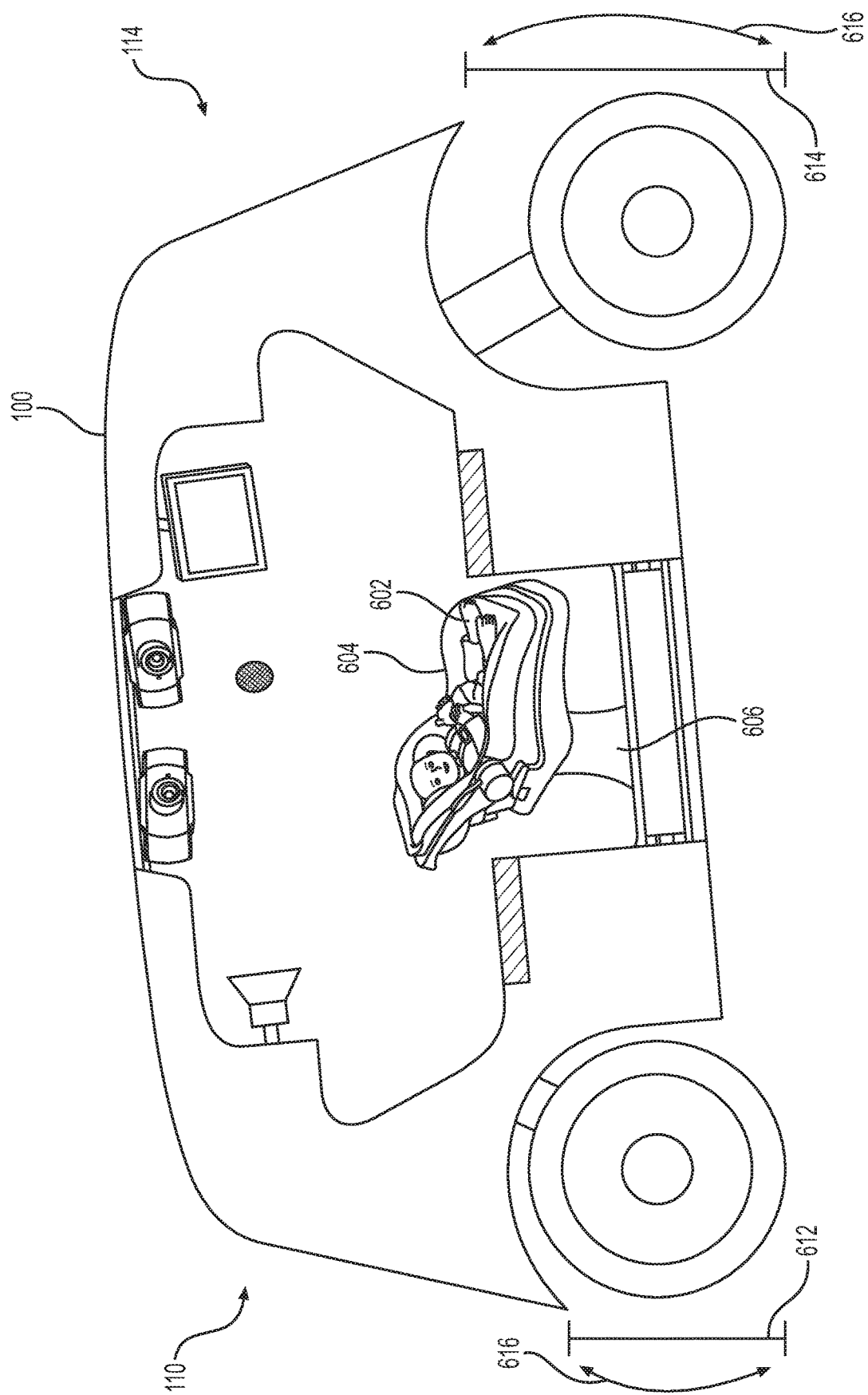
FIG. 6B is a second example of the vehicle using the suspension to cause the child car seat to "rock" back-and-forth within the vehicle.

In some instances, the system may utilize one or more additional features of the vehicle 100 to improve the riding experience of passengers. For instance, as illustrated in the example of FIGS. 6A-6B, a passenger 602 may be secured in a child car seat 604 within the vehicle 100. As shown, the child car seat 604 is secured within the vehicle 100 using an attachment mechanism 606. The attachment mechanism 606 can include one or more brackets, stands, pedestals, mounts, seat belts, bolts, locks, and/or other types of connections that hold the child car seat 604 in place within the vehicle 100. In some instances, the user securing the passenger 602 in the child car seat 604 can attach the child car seat 604 to the attachment mechanism 606. Additionally, or alternatively, in some instances, the child car seat 604 may remain secured within the vehicle 100 such that the child car seat 604 is already secure in the vehicle 100 when the vehicle picks up the passenger 602.

As shown in the example of FIGS. 6A-6B, the system can cause the vehicle 100 to "rock" back-and-forth, which in turn causes the child car seat 604 rock with the vehicle 100. For instance, as illustrated in FIG. 6A, the system can control one or more components of the vehicle 100 (e.g., the suspension, hydraulics, etc.) in order to cause the first end 110 of the vehicle 100 to raise to a first distance 608 off the ground and cause the second end 114 of the vehicle 100 to lower to a second distance 610 off the ground, where the first distance 608 is greater than the second distance 610.

Next, as illustrated in FIG. 6B, the system can control the one or more components of the vehicle 100 in order to cause the first end 110 of the vehicle 100 to lower to a third distance 612 off the ground and cause the second end 114 of the vehicle 100 to raise to a fourth distance 614 off the ground, where the fourth distance 614 is greater than the third distance 612. In some instances, the system can continuously cause the first end 110 and the second end 114 of the vehicle 100 to raise/lower (e.g., rotate 616) as shown in FIGS. 6A-6B. By causing the vehicle to operate using such a motion, the passenger 602 secure in the child car seat 604 can experience "rocking" while the passenger 602 remains in the vehicle 100.

In some instances, the system can further "rock" the vehicle 100 back-and-forth by causing the vehicle 100 to move side-to-side. For instance, the system can continuously cause the vehicle 100 to travel a short distance in the first direction of travel, followed by causing the vehicle 100 to travel a short distance in the second direction of travel, followed by causing the vehicle 100 to travel a short distance in the first direction of travel, and so forth. In such instances, the short distance can include a foot, two feet, five feet, and/or the like.

Figure 7:
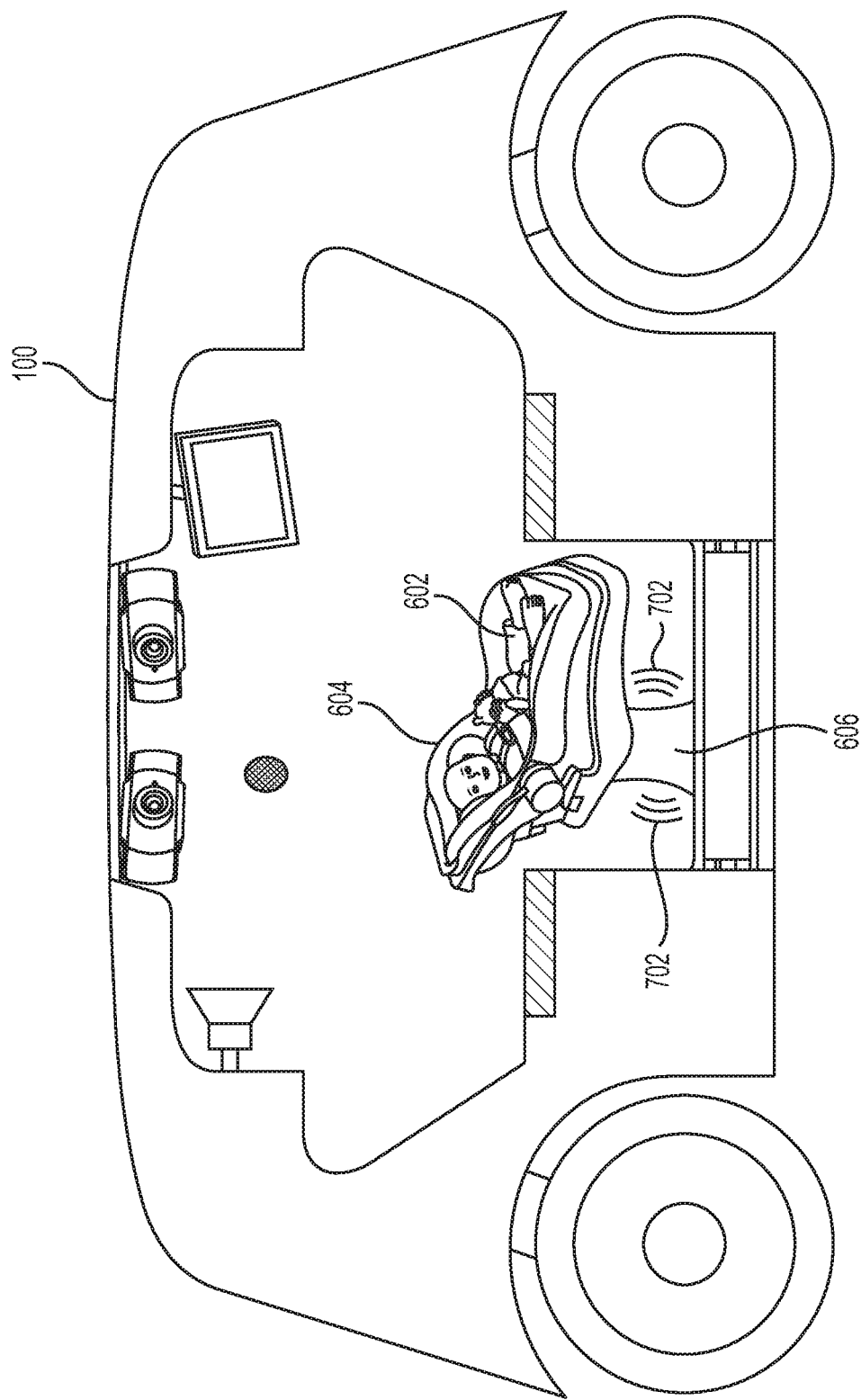
FIG. 7 is an example of a vehicle causing a child car seat to vibrate.

Additionally, or alternatively to causing the vehicle 100 to "rock" back-and-forth, and as shown in the example of FIG. 7, the system can cause the child car seat 604 to vibrate. For instance, the attachment mechanism 606 may include one or more components (e.g., motor(s)) that cause the attachment mechanism 606 to oscillate (represented by vibrating lines 702) around an equilibrium, such as the center axis of the attachment mechanism 606. As such, the system may send data to the vehicle 100 that causes the vehicle 100 to oscillate the attachment mechanism 606. As the attachment mechanism 606 begins to oscillate, the child car seat 604 attached to the attachment mechanism 606 can start to oscillate with the attachment mechanism 606, which the passenger 602 can experience as continuous, periodic, or intermittent vibration.

Figure 8A:
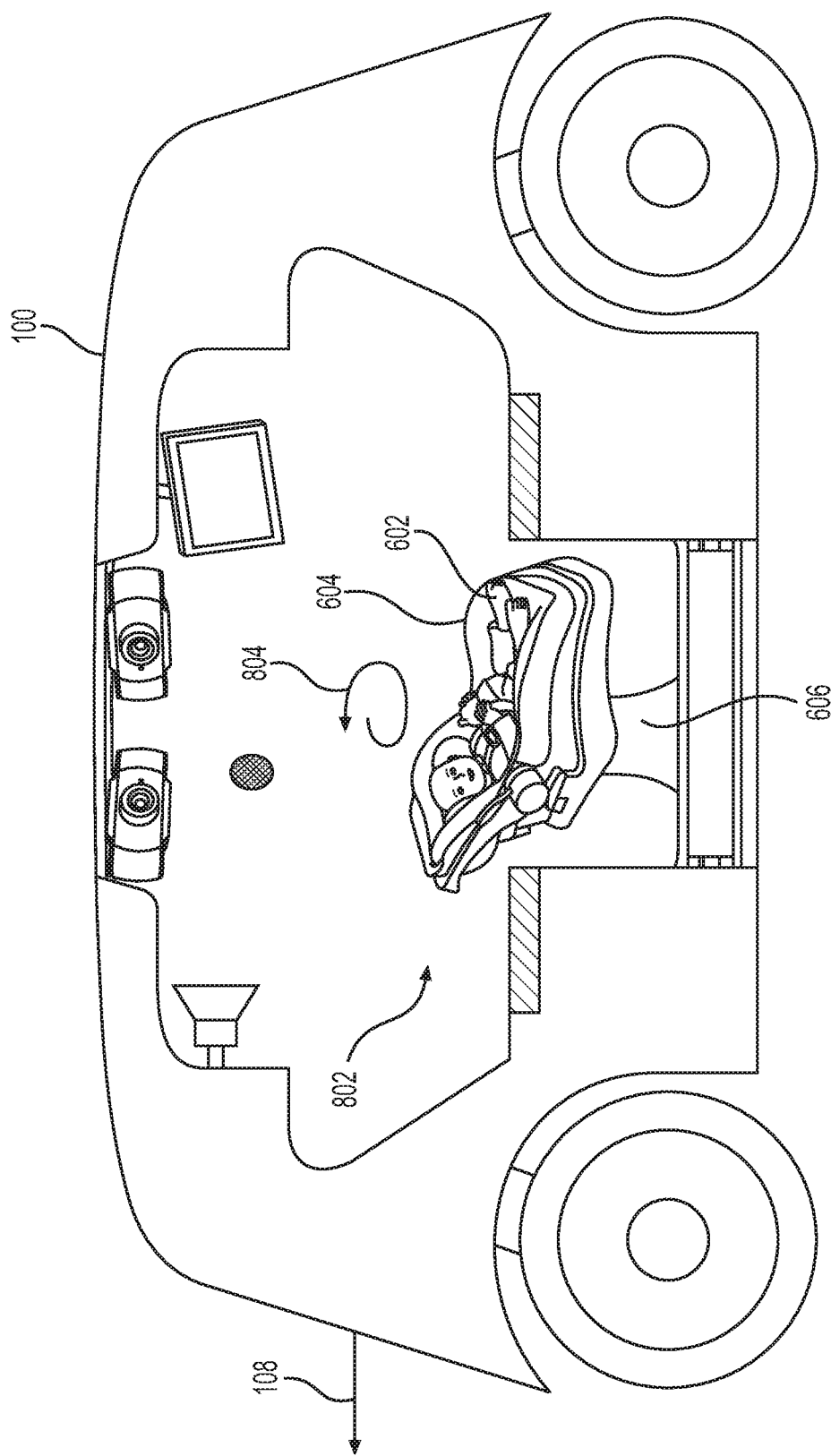
FIG. 8A is an example of causing a child car seat to be positioned in a first orientation while a vehicle navigates in a first direction of travel.
Figure 8B:
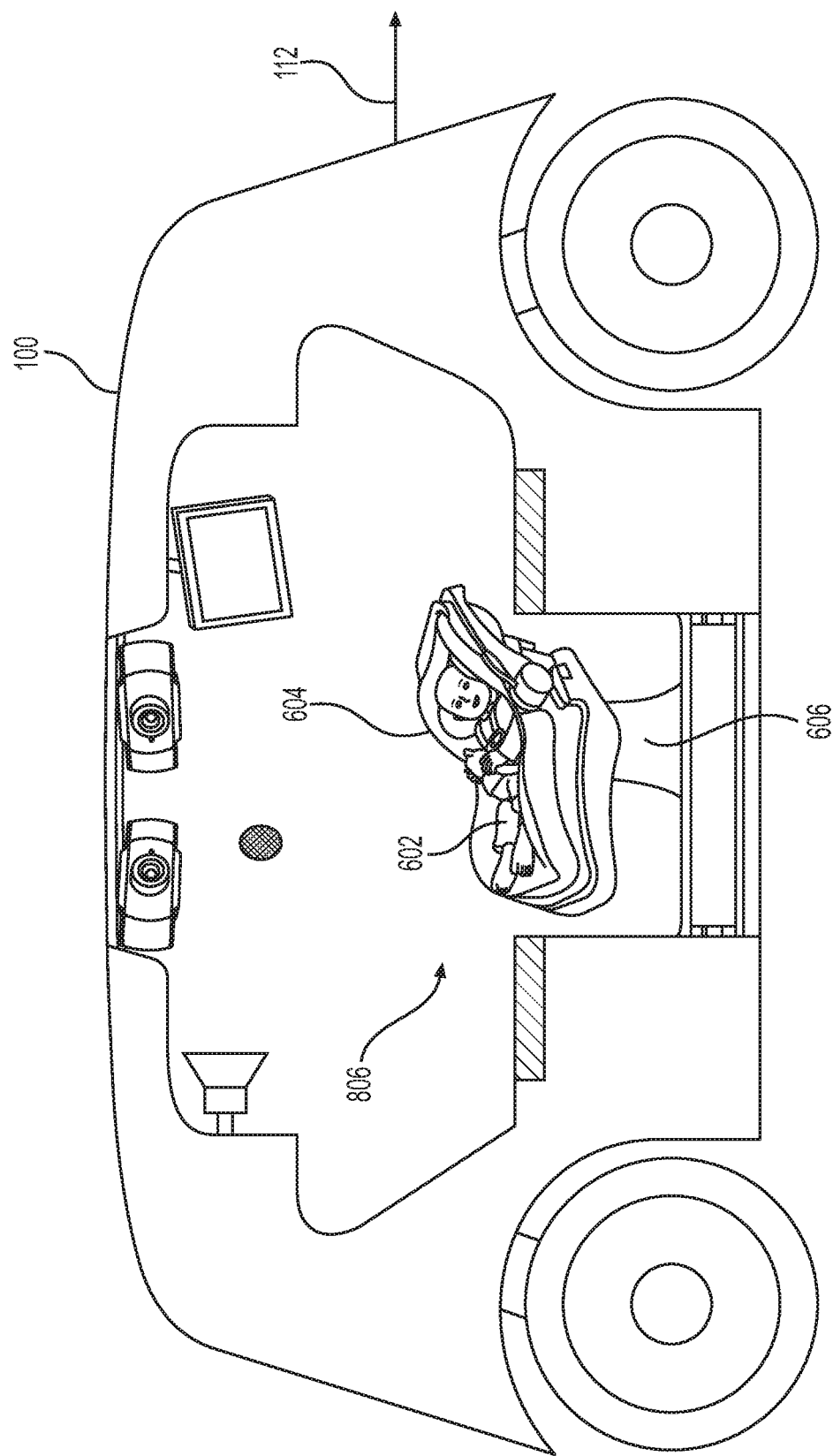
FIG. 8B is an example of causing the child car seat to rotate to a second orientation while the vehicle navigates in a second direction of travel.

Additionally, or alternatively, in some instances, and as shown in the example of FIGS. 8A-8B, the system can cause the child car seat 604 to rotate within the vehicle 100. For instance, as discussed above, the system can cause the vehicle 100 to operate in a second mode of operation in which the vehicle 100 is configured to navigate in a direction of travel. For instance, as shown in the FIG. 8A, the vehicle 100 may be operating in the second mode of operation and navigating in the first direction of travel 108 while the passenger 602 is secure in the child car seat 604. In some instances, the system may have determined the first direction of travel 108 based on the pose of the passenger 602 and/or a first orientation 802 of the child car seat 604 within the vehicle 100. For instance, the system may have determined the first direction of travel 108 such that the passenger 602 is rear-facing in the vehicle 100.

In some instances, the vehicle 100 may need to switch from navigating in the first direction of travel 108 to navigating in the second direction of travel 112. For example, the vehicle 100 may encounter an obstacle, such as an accident, that blocks the route of the vehicle 100 such that the vehicle 100 is required to navigate in the opposite direction. In response, the system may cause the child car seat 604 to rotate 804. For instance, the system may cause the vehicle 100 to activate a motor (and/or other component) within the attachment mechanism 606 that causes the child car seat 604 to rotate. As illustrated in FIG. 8B, the child car seat 604 now includes a second orientation 806 within the vehicle 100, which causes the pose of the passenger 602 to change such that the passenger 602 is facing the opposite direction. The system can then cause the vehicle 100 to navigate in the second direction of travel 112.

It should be noted that, while the examples in FIGS. 6A-8B illustrate the the child car seat 604 being secure to the attaching mechanism 606, in some instances, the vehicle 100 may not include the attaching mechanism 606 and/or the child car seat 604 may not be secure to the attaching mechanism 604. For instance, in some examples, the child car seat 604 may be secured to one of the seats within the vehicle 100 using a seat belt and/or other type of attachment. In such examples, the vehicle 100 may still be able to rock, vibrate, and/or rotate the passenger 602 and/or child car seat 604. For instance, the system can still continuously cause the first end 110 and the second end 114 of the vehicle 100 to raise/lower (e.g., rotate 616) in order to provide the passenger 602 with the "rocking" motion. Additionally, the system can cause the seats within the vehicle 100 and/or the child car seat 604 to vibrate using one or more components (e.g., motors, haptic devices, etc.) built into the seats and/or the child car seat 604. Furthermore, at least one of the seats within the vehicle may include a component (e.g., a motor) that can rotate the child car seat 604, and the system may cause the child car seat 604 to rotate using the component.

Figure 9:
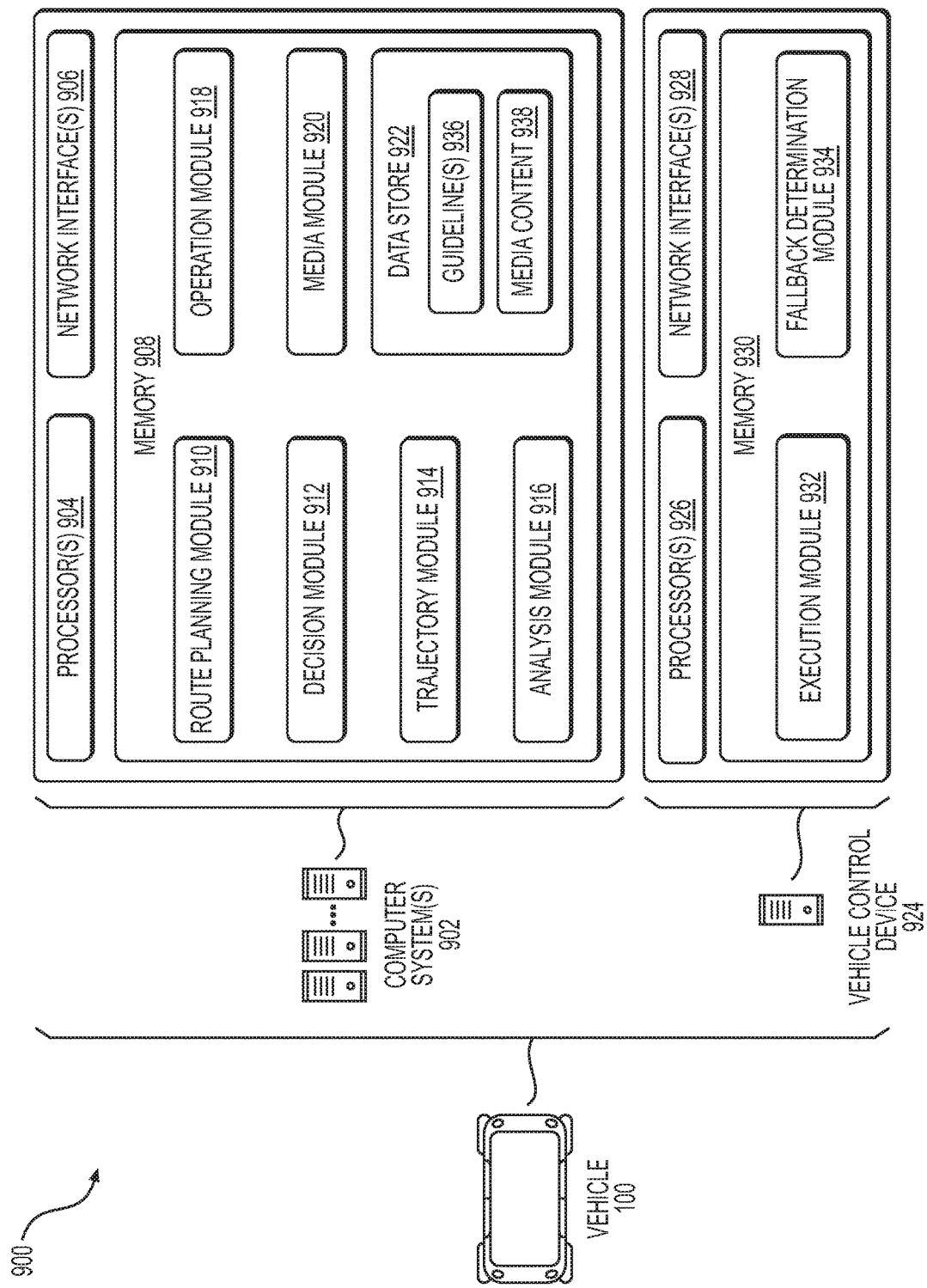
FIG. 9 illustrates an example architecture for generating and executing trajectories to control a vehicle, and for changing a mode of operation of the vehicle.

FIG. 9 illustrates an example architecture 900 for generating and executing trajectories to control the vehicle 100. For instance, the architecture 900 can include computer system(s) 902 including various hardware and/or software to implement aspects of the systems, methods, and apparatuses described herein. For instance, the computer system(s) 902 can include processor(s) 904, network interface(s) 906, and memory 908, which stores a route planning module 910, a decision module 912, a trajectory module 914, an analysis module 916, an operation module 918, a media module 920, and a data store 922. Additionally, the architecture 900 can include a vehicle control device 924 including various hardware and/or software to implement aspects of the systems, methods, and apparatuses described herein. In some instances, the vehicle control device 924 can be a separate and distinct computer system, which can include processor(s) 926, network interface(s) 928, and memory 930, which can store an execution module 932 and an alternative determination module 934. In some instances, the computer system(s) 902 may comprise the vehicle control device 924.

In some instances, the computer system(s) 902 and vehicle control device 924 can be embodied in the vehicle 100, or any other type of transportable computer system. In other instances, the computer system(s) 902 can be remotely located from the vehicle 100 and the vehicle control device 924 can be embodied in the vehicle 100. In some instances, the computer system(s) 902 can provide planning functionality for the vehicle 100 and the vehicle control device 924 can provide execution functionality for the vehicle 100, as described herein.

As described above, the computer system(s) 902 can include a route planning module 910, a decision module 912, a trajectory module 914, an analysis module 916, an operation module 918, a media module 920, and a data store 922. The route planning module 910 can be configured to determine a most efficient route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In at least one example, the route planning module 910 can perform a search, such as a graph search, on top of a map to identify a route to guide the vehicle 100 from a first location to a second location. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planning module 910 can utilize a graph traversal algorithm to identify a route to guide the vehicle 100 from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In at least one example, the decision module 912 can receive the route (e.g., the sequence of waypoints) and can generate an instruction for guiding the vehicle 100 along at least a portion of the route from the first location to the second location. In at least one example, the decision module 912 can determine how to guide the vehicle 100 from a first waypoint in the sequence of waypoints to a second waypoint in the sequence of waypoints. In some instances, the instruction can be a trajectory, or a portion of a trajectory. In such examples, the decision module 912 can generate a sequence of actions (e.g., drive down the road, accelerate, change lanes, turn left, etc.) to guide the vehicle 100 along the route. A non-limiting example of a trajectory can be "drive the vehicle 100 at 10 meters/second." In other examples, the instruction can be a policy. A policy can be used to determine a trajectory of the vehicle 100 based on real-time processed data received from sensor(s) on the vehicle 100. A non-limiting example of a policy can be "follow the car in front by 5 meters."

In at least one example, the decision module 912 can determine an alternative instruction. The alternative instruction can be an instruction that the vehicle 100 is to follow when an event warranting an alternative action. For instance, as discussed above, the computer system(s) 902 can analyze the passenger compartment of the vehicle 100 to determine the occurrence of an event. Based on identifying the occurrence of an event, the decision module 912 can determine an alternative instruction, such as causing the vehicle 100 to travel along a route to a given location. In some instances, the given location can include a location in which the vehicle 100 picked a passenger up.

The trajectory module 914 can receive the instruction and can optimize the instruction based on objects identified in the environment. In at least one example, the trajectory module 914 can access, receive, and/or determine real-time processed data to determine object(s) in the environment which the vehicle 100 is travelling. In the at least one example, the trajectory module 914 can process the instruction in view of the real-time processed data.

In an example where the instruction is a trajectory, the trajectory module 914 can leverage model(s) and/or algorithm(s), constraint(s), and/or cost(s) to optimize the trajectory. For instance, the trajectory module 914 can utilize model(s) and/or algorithm(s) including, but not limited to, differential dynamic programming, interior point optimization, sequential quadratic programming, etc. to refine the trajectory. In at least one example, the constraint(s) can include, but are not limited to, cost(s), comfort, safety, rules of the road, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the vehicle 100 can be optimized to include a positive, a negative, or a zero value. In at least one example, a rotation of the vehicle 100 can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed data, the trajectory module 914 can generate an output trajectory.

In at least one example, the trajectory module 914 can receive an alternative instruction from the decision module 912. In such examples, the trajectory module 914 can generate an output alternative trajectory based on processing the alternative instruction in a substantially similar manner as described above. In some instances, as described above, the trajectory module 914 can output the output trajectory and the output alternative instruction at the same time.

The analysis module 916 can receive data from one or more sensors within the passenger compartment of the vehicle 100. The one or more sensors can include imaging device(s) (e.g., cameras), weight sensor(s), seat belt sensor(s), microphones(s), and/or the like. The analysis module 916 can then analyze the data to determine operating modes for the vehicle 100, events occurring within the vehicle 100, and/or the like. For example, the analysis module 916 can analyze the data to determine that at least one passenger within the vehicle 100 is secure within a child car seat. Based on the determination, the analysis module 916 can send data to the operation module 918 indicating that there is a passenger secured in a child car seat within the vehicle 100. The operation module 918 can receive the data and, in response, cause the vehicle 100 to switch from operating in a first mode of operations, which may include a bidirectional mode, to a second mode of operation, which may include a unidirectional mode.

In some instances, the analysis module 916 can further analyze the data to determine which direction the vehicle 100 should navigate while in the second mode of operation. For instance, the analysis module 916 can analyze the data to determine a pose of at least one passenger within the vehicle. In some instances, the passenger includes a passenger that is secure in a child car seat. The analysis module 916 can then determine the direction of travel based on the pose. For example, guideline(s) 936 may include one or more laws, codes, regulations, and/or the like that specify which direction passengers in child car seats should face while in vehicles. In some instances, the guideline(s) 936 may also include scientific articles or other types of guidelines that suggest which direction passengers in child car seats should face while in vehicles. In some instances, the guidelines(s) 936 may be based on the age of the passenger, the height of the passenger, the weight of the passenger, and/or the like. The analysis module 916 can thus use the guideline(s) 936, such as at least one guideline 936 that applies in the area of operation (e.g., city, state, etc.) at which the vehicle 100 is located, and the pose, age, height, and/or weight of the passenger to determine a direction of travel for the vehicle 100.

In some instances, the analysis module 916 can further analyze the data to identify the occurrence of an event within the vehicle 100. For instance, the analysis module 916 can analyze the data to determine that a passenger within the vehicle is crying. In response to determining that an event is occurring, the trajectory module 914 can use an alternative instruction from the decision module 912 to generate an alternative trajectory for the vehicle 100. In some instances, the alternative trajectory includes a trajectory from the current location of the vehicle 100 to a given location, such as the location that the vehicle 100 picked up the passenger.

The operation module 918 can cause the vehicle 100 to switch between the first mode of operation and the second mode of operation. For example, the operation module 918 may cause the vehicle 100 to operate in the first mode of operation when the vehicle 100 does not include a passenger secured in a child car seat and operate in the second mode of operation when the vehicle 100 does include a passenger secure in a child car seat. In some instances, the operation module 918 may further limit locations in which the vehicle 100 is authorized to operate. For instance, the operation module 918 can limit the locations based on the vehicle 100 including a passenger secure in a child car seat, receiving data indicating the locations (such as from an electronic device), and/or the like.

The media module 920 can select media content 938 to be output within the vehicle 100. Media content 938 can include video content (e.g., movies, television show, etc.), audio content (e.g., music, electronic books, the news, etc.), games, and/or the like. In some instances, the media module 920 selects the media content 938 based on receiving input, such as a request from an electronic device. The electronic device can include an electronic device of one of the passengers or an electronic device of a user outside of the vehicle 100 (e.g., a parent of a passenger). In some instances, the media module 920 can select the media content 938 based on characteristics of at least one of the passengers, such as the age of a passenger. In some instances, the media module 920 can select the media content 938 using a profile of a passenger and/or user. For instance, if a user uses an electronic device to request the vehicle 100, the media module 920 may store and utilize a profile associated with the user to select the media content 938. For example, the profile may be associated with data that indicates which media content 938 to output in the vehicle 100 while the user and/or a passenger associated with the user is within the vehicle 100.

In some instances, the media module 920 can further use one or more additional features associated with the vehicle 100 to improve the riding experience of passengers within the vehicle 100. For instance, the media module 920 can cause the vehicle 100 to "rock" back-and-forth using the suspension and/or hydraulics of the vehicle 100. Additionally, the media module 920 can cause a child car seat within the vehicle 100 to vibrate. Furthermore, the media module 920 can cause a child car seat to rotate from a first orientation within the vehicle 100 to a second orientation within the vehicle 100. Moreover, the media module 920 can control the temperature within the passenger compartment of the vehicle 100.

As described above, the vehicle control device 924 can be a separate and distinct computer system, which can include an execution module 932 and an alternative determination module 934. The execution module 932 can receive the output trajectory from the trajectory module 914 and can compute commands for actuating steering and acceleration of the vehicle 100 to enable the vehicle 100 to follow the output trajectory. In at least one example, the execution module 932 can receive the output trajectory and can compute a steering angle and velocity to enable the vehicle 100 to follow the output trajectory.

The alternative determination module 934 can access, receive, and/or generate alternative trajectory(s). As described above, an alternative trajectory can be a trajectory that the vehicle 100 is to follow responsive to determining an occurrence of an event warranting an alternative action. In at least one example, an event can be a problem with the computer system(s) 902. For instance, a sensor associated with the computer system(s) 902 can fail or a component of the vehicle 100 can malfunction (e.g., tire pops, windshield shatters, etc.). Or, an event can be associated with a lack of communication from the computer system(s) 902 and/or responsiveness of the computer system(s) 902. In some instances, an event can be an object that is within a threshold distance of the vehicle 100, an object that is predicted to be within a threshold distance of the vehicle 100, or a probability of an accident (i.e., collision) exceeding a threshold probability. Moreover, in at least one example, an event can be associated with an occupancy status of the vehicle 100. An occupancy status of the vehicle 100 can indicate when a passenger in the vehicle 100 becomes incapacitated, when a passenger (or object associated with a passenger) is defenestrated from the vehicle 100, wherein a passenger in the vehicle 100 is crying, etc. Furthermore, an event can be associated with a status of a drivable surface associated with the vehicle 100. The status of the drivable surface can indicate when a drivable surface is impassible (e.g., a bridge has collapsed, weather has caused an impassible condition, etc.).

As discussed herein, processor(s), such as processor(s) 904 and processor(s) 926, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 908 and memory 930, may be an example of tangible non-transitory computer storage media and may include volatile and nonvolatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Network interface(s), such as network interface(s) 906 and network interface(s) 928, may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Figure 10:
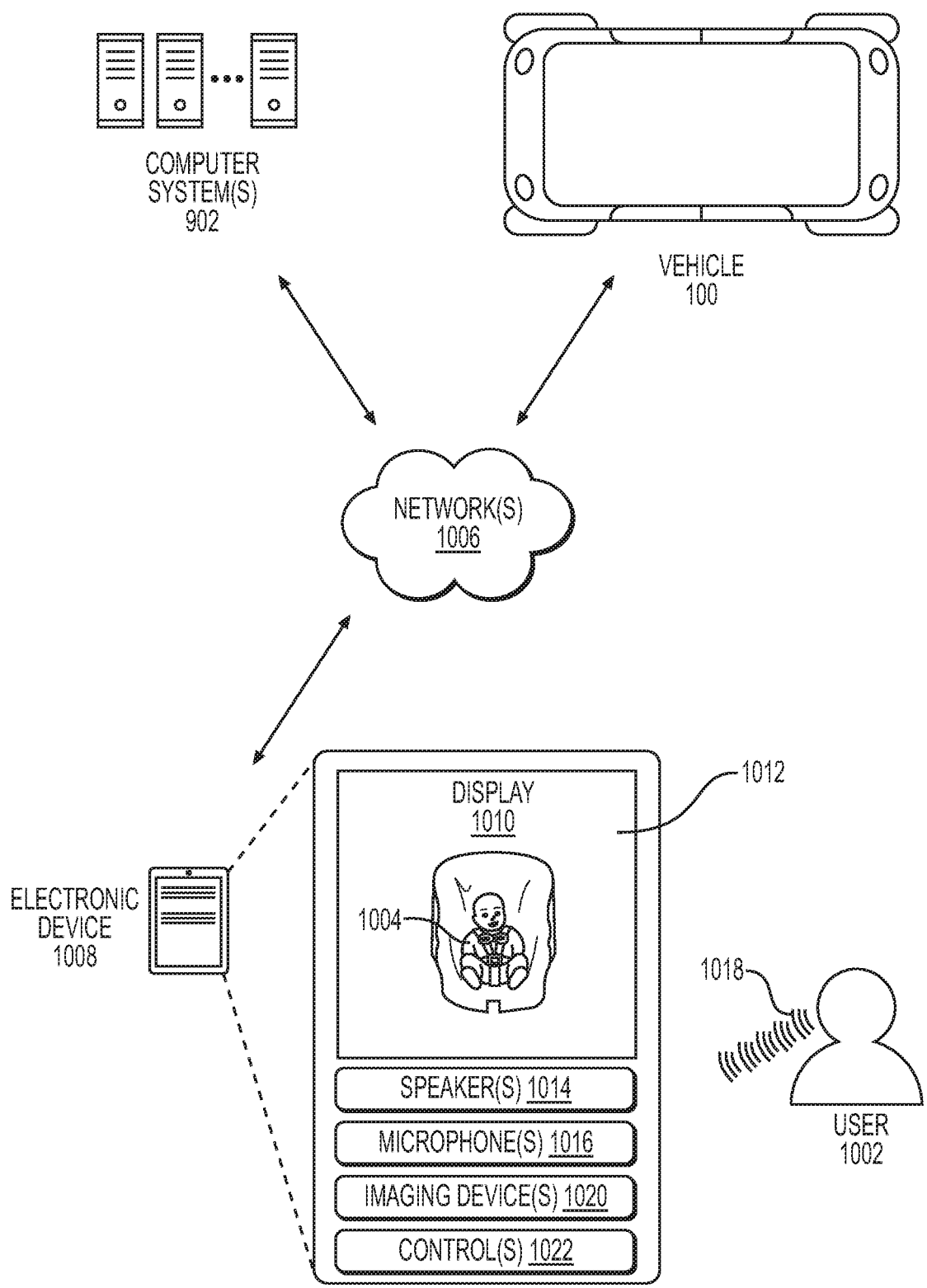
FIG. 10 illustrates an example of providing a user outside of a vehicle with the ability to monitor a passenger within the vehicle.

FIG. 10 illustrates an example of providing a user 1002 outside of the vehicle 100 with the ability to monitor a passenger 1004 within the vehicle 100 and control certain aspects of the experience related to the vehicle 100. For instance, as discussed above, the computer system(s) 902 can receive data representing the passenger compartment of the vehicle 100. In response, the computer system(s) 902 can send, via network(s) 1006, at least a portion of the data to an electronic device 1008 associated with the user 1002. In some instances, the electronic device 1008 may have previously sent a request to the computer system(s) 902 for the vehicle 100. In some instances, the user 1002 may be associated with the passenger 1004, such as a parent of the passenger 1004.

The electronic device 1008 can receive the data from the computer system(s) 902 and provide content to the user 1002. For instance, the data can include image data captured by one or more imaging devices within the vehicle 100. The electronic device 1008 can thus use the image data to present, using a display 1010, images and/or a video feed 1012 representing the passenger compartment of the vehicle 100. Additionally, the data can include audio data representing sound captured within the passenger compartment of the vehicle 100. The electronic device 1008 can thus output, using speaker(s) 1014, audio content representing the sound within the passenger compartment.

In some instances, the user 1002 can utilize the electronic device 1008 to communicate with the passenger 1004 within the vehicle 100. For instance, the electronic device 1008 may capture, using microphone(s) 1016, user speech 1018 from the user 1002. The electronic device 1008 can then generate audio data representing the user speech 1018 and send the audio data to the computer system(s) 902. In response, the computer system(s) 902 can send the audio data to the vehicle 100. The vehicle 100 can receive the audio data from the computer system(s) 902 and, in response, output audible content representing the user speech 1018 using one or more speakers.

In some instances, the user 1002 can further use the electronic device 1008 to send images and/or videos to the passenger 1004 within the vehicle 100. For instance, the electronic device 1008 may capture, using imaging device(s) 1020 (e.g., camera), image data representing the user 1002. The electronic device 1008 can then send the image data to the computer system(s) 902 which, in response to receiving the image data, can send the image data to the vehicle 100. The vehicle 100 can receive the image data from the computer system(s) 902 and present the images and/or videos associated with the image data to the passenger 1004 using one or more displays (e.g., displays 206) in the vehicle 100.

In some instances, the user 1002 can further use the electronic device 1008 to control one or more features of the vehicle 100. For instance, control(s) 1022 may provide the user 1002 with the ability to select media content to be presented in the vehicle 100, control a location for parking the vehicle 100, limit locations in which the vehicle 100 is authorized to operate, control one or more features associated with the vehicle 100 (e.g., "rock" the vehicle back-and-forth, vibrate the child car seat, etc.), control a temperature within the passenger compartment of the vehicle 100, and/or the like. Based on receiving input via the control(s) 1022, the electronic device 1008 can send data indicating the input to the computer system(s) 902. In response, the computer system(s) 902 can cause the vehicle 100 to perform one or more operation, using the techniques described above.

For example, the user 1002 may use the electronic device 1008 to control a route of the vehicle 100. To control the route, the user 1002 may input a starting position for the vehicle 100, an ending position for the vehicle 100, and/or one or more roads that the vehicle 100 is to travel in order to navigate from the starting position to the ending positon. Based on receiving the input via the control(s) 1022, the electronic device 1008 can send data indicating the input to the computer system(s) 902. In response, the computer system(s) 902 can cause the vehicle 100 to navigate from the starting position to the ending position using the one or more roads.

In some instances, the user 1002 may be able to set the route such that the vehicle 100 continuously navigates along the route in a "repeated" manner. For instance, the electronic device 1008 may receive input indicating a repeated route that includes a similar starting position and ending position, and one or more roads that the vehicle 100 is to navigate between the starting position and the ending position such that the vehicle 100 is navigating in a "circular" manner. The user 1002 can further input information indicating that the vehicle 100 is to navigate the repeated route a given number of times, such as five, ten, or the like, or information indicating that the vehicle 100 is to navigate the repeated route until the computer system(s) 902 receives an indication from the electronic device 1008 to stop the vehicle 100 (e.g., bring the vehicle 100 back to the ending position). Based on receiving the input via the control(s) 1022, the electronic device 1008 can send data indicating the input (e.g., the repeated route) to the computer system(s) 902. In response, the computer system(s) 902 can cause the vehicle 100 to navigate along the repeated route as instructed by the user 1002.

Figure 11:
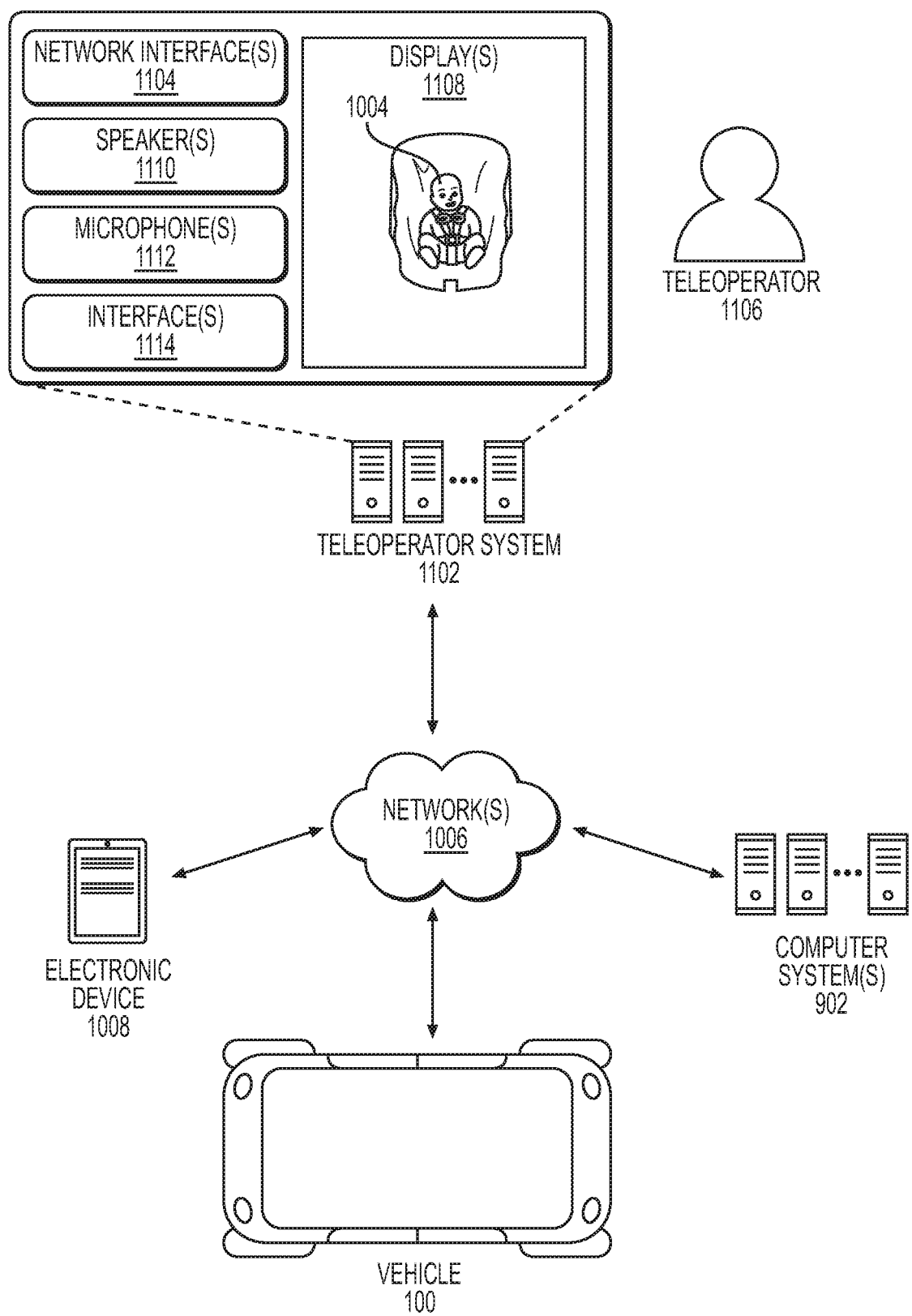
FIG. 11 illustrates an example of using a teleoperator system to monitor a passenger in a vehicle.

FIG. 11 shows an example of using a teleoperator system 1102 to monitor one or more passengers within the vehicle 100. For instance, the teleoperator system 1102 may be coupled to the vehicle 100, for example, via network interface(s) 1104 of the teleoperator system 1102 and network interface(s) 928 of the vehicle 100. The vehicle 100 may send data to the teleoperator system 1102, such as the vehicle's 106 current position, current speed, current path and/or trajectory, current occupancy, the level of charge of one or more of its batteries, and/or the operational status. Additionally, the vehicle 100 may send the data representing the passenger compartment of the vehicle 100 to the teleoperator system 1102.

In some instances, and as shown in FIG. 11, a teleoperator 1106 may be able to access the data received from the vehicle 100. For example, the teleoperator 1106 may be able to view the interior of the passenger compartment of the vehicle 100 via display(s) 1108. Additionally, the teleoperator 1106 may be able to hear sound from within the passenger compartment of the vehicle 100 via speaker(s) 1110. In some instances, in addition to accessing the data, the teleoperator 1106 may be able to communicate with the passenger(s) 1004 within the vehicle 100 and/or the user of the electronic device 1008. For instance, the teleoperator system 1102 may capture user speech from the teleoperator 1106 via microphone(s) 1112 and, in response, generate audio data that represents the user speech. The teleoperator system 1102 can then send the audio data to the vehicle 100 to be output to the passenger 1004 and/or the user of the electronic device 1008. Additionally or alternatively, the passenger 1004 or the user of the electronic device 1008 may communicate with the teleoperator 1106.

In some instances, the teleoperator 1106 may be able to provide guidance to the vehicle 100. For instance, the teleoperator 1106 may utilize the interface(s) 1114, which can provide the teleoperator 1106 with the ability to navigate the vehicle 100. For example, if the teleoperator 1106 determines that an event within the vehicle 100 is occurring, such as the crying passenger 1004, the teleoperator 1106 may utilize the interface(s) 1114 to cause the vehicle to navigate to a given location. In some instances, the location can include the geographical location of the electronic device 1008.

Although the example of FIG. 11 describes the vehicle 100 sending the data to the teleoperator system 1102, in some instances, the computer system(s) 902 may send the data to the teleoperator system 1102. For instance, the computer system(s) 902 may analyze the data to determine that the passenger 1004 within the vehicle 100 is secure in a child car seat. Based on the determination, the computer system(s) 902 may send the data to the teleoperator system 1102 so that the teleoperator 1106 can monitor the passenger compartment of the vehicle 100.

Figure 12:
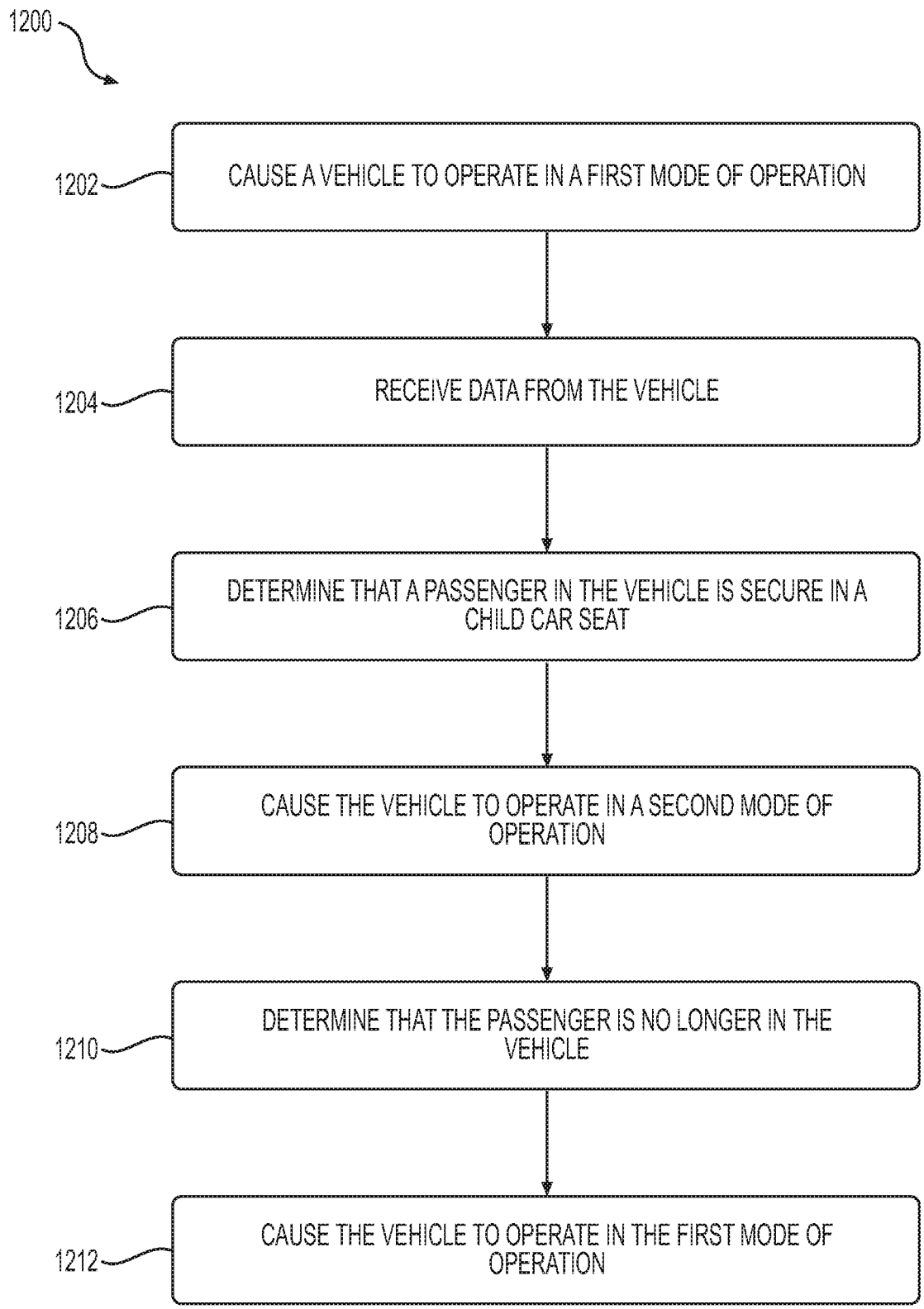
FIG. 12 illustrates a flow diagram of an example process for causing a vehicle to switch modes of operation.

FIG. 12 illustrates a flow diagram of an example process 1200 for causing a vehicle to switch modes of operation. The process 1200, as well as other processes described herein, are illustrated as collections of blocks in logical flow diagrams, which represent a sequence of operations, some or all of which can be implemented in hardware, software or a combination thereof. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 1202, the process 1200 causes a vehicle to operate in a first mode of operation. For instance, a system may receive data from an autonomous vehicle that is configured to navigate in both a first direction of travel and a second direction of travel. The data may include image data, audio data, and/or any other type of data representing the passenger compartment of the vehicle. The system can analyze the data to determine that the vehicle does not include a passenger secure in a child car seat. Based on the determination, the system can cause the vehicle to operate in the first mode of operation, which may include a bidirectional mode of operation.

At 1204, the process 1200 receives data from the vehicle and at 1206, the process 1200 determines that a passenger in the vehicle is secure in a child car seat. For instance, the system may continuously receive data from the vehicle. As discussed above, the data may include image data, audio data, and/or any other type of data representing the passenger compartment of the vehicle. The system can then analyze the data to determine that the passenger is secure in the child car seat. For instance, the system can analyze the image data to determine that the image data represents the passenger secure in the child car seat.

At 1208, the process 1200 causes the vehicle to operate in a second mode of operation. For instance, based on the vehicle including the passenger secure in the child car seat, the system can cause the vehicle to operate in the second mode of operation. In some instances, the second mode of operation can include a unidirectional mode of operation, where the vehicle is restricted to unidirectional travel. In some instances, the system determines the direction of travel based on a pose of the passenger.

At 1210, the process 1200 determines that the passenger is no longer in the vehicle and at 1212, the process 1200 causes the vehicle to operate in the first mode of operation. In some instances, the system can determine that the passenger is no longer in the vehicle by receiving data from the vehicle and/or an electronic device associated with the passenger that indicates that the passenger is no longer in the vehicle. In some instances, the system can determine that the passenger is no longer in the vehicle by receiving and analyzing additional data from the vehicle. In either instance, based determining that the passenger is no longer in the vehicle, the system can cause the vehicle to once again operate in the first mode of operation.

Figure 13:
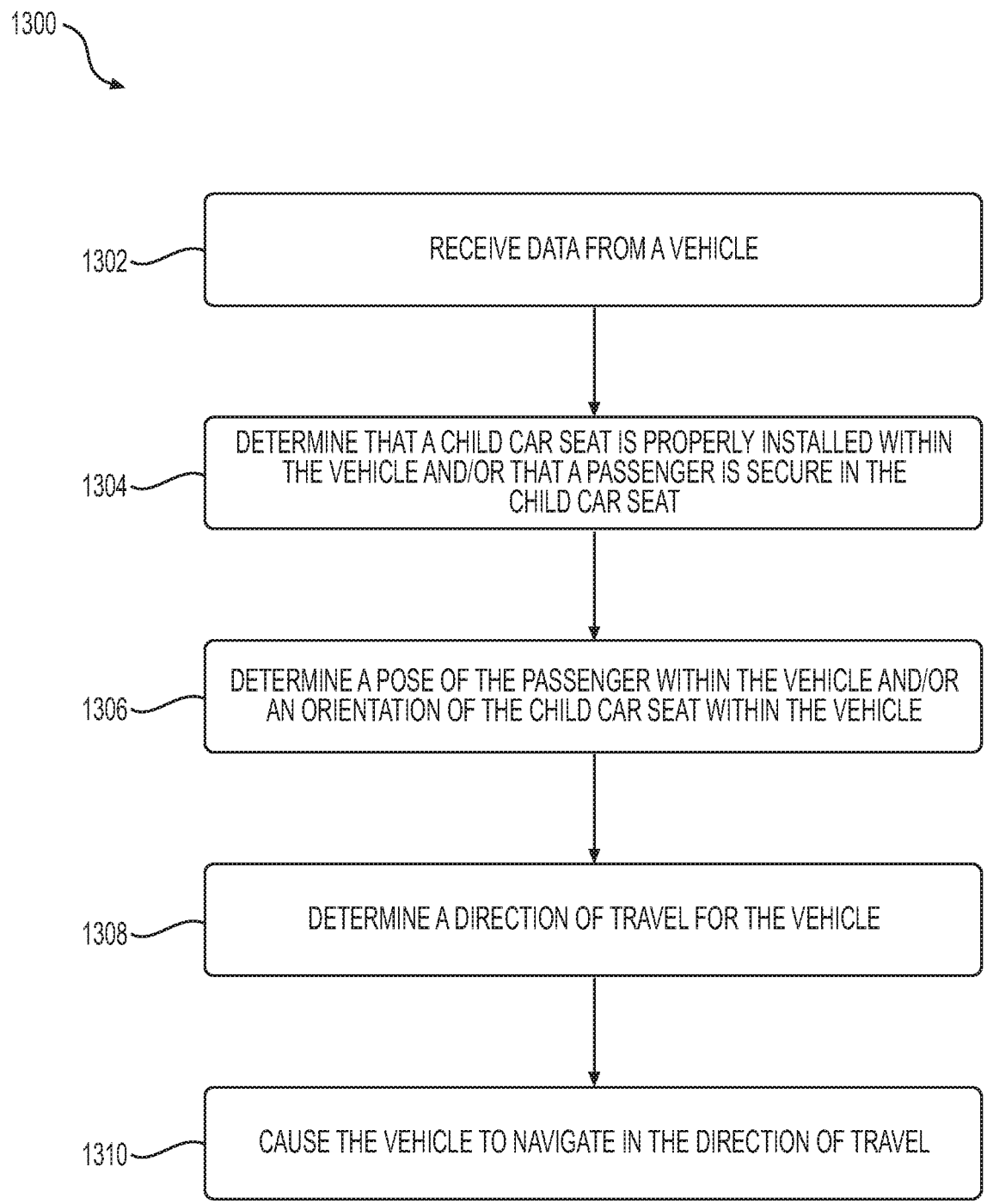
FIG. 13 illustrates a flow diagram of an example process for causing a vehicle to navigate in a direction of travel that is based on a passenger within the vehicle.

FIG. 13 illustrates a flow diagram of an example process 1300 for causing a vehicle to navigate in a direction of travel that is based on a passenger within the vehicle. At 1302, the process 1300 receives data from a vehicle and at 1304, the process 1300 determines that a child car seat is properly installed within the vehicle and/or that a passenger is secure in the child car seat. For instance, a system may continuously receive data from one or more sensors within the vehicle, where the data represents the passenger compartment of the vehicle. The system can then analyze the data to determine that the passenger is secure in the child car seat. For example, the system may analyze image data to determine that the image data represents the passenger in the child car seat. For another example, the child car seat may be built into the vehicle and with a sensor in the seat belt, and the system may analyze data from the sensor to determine that the seat belt is fastened.

In some instances, the system may further determine that the passenger is properly secured in the child car seat. For instance, the system can analyze the data to determine that the restraints (e.g., seat belts) of the child car seat are secure (e.g., buckled, locked, etc.). In some instances, the system may further determine that the child car seat is properly secured in the vehicle. For instance, the system can analyze the data to determine that the restraints (e.g., seat belts) of the vehicle are secured (e.g., bucked, locked, etc.) to the child car seat. In some instances, the system may suspend the vehicle from navigating when the passenger is not properly secured in the child car seat and/or the child car seat is not properly secured to the vehicle.

At 1306, the process 1300 determines a pose of the passenger within the vehicle and/or an orientation of the child car seat within the vehicle. For instance, the system can analyze the data to determine the pose of the passenger, such as the three-dimensional location and orientation of the head of the passenger. In some instances, analyzing the data can include analyzing the data using on or more computer-vision models, methods, and/or algorithms associated with pose estimation to detect the pose of the passenger. Additionally, or alternatively, in some instances, analyzing the data can include analyzing the data to determine the orientation of the child car seat and then determining the pose based on the orientation.

At 1308, the process 1300 determines a direction of travel for the vehicle and at 1310, the process 1300 causes the vehicle to navigate in the direction of travel. For instance, the system can determine the direction of travel based on the pose of the passenger. For instance, if the vehicle is operating in an area that includes one or more laws, codes, or regulations specifying a direction that passengers secured in child car seats are to face when in vehicles, the system can determine the direction of travel such that the passenger in the child car seat is facing the correct direction. The system can then cause the vehicle to navigate in the direction of travel.

Figure 14:
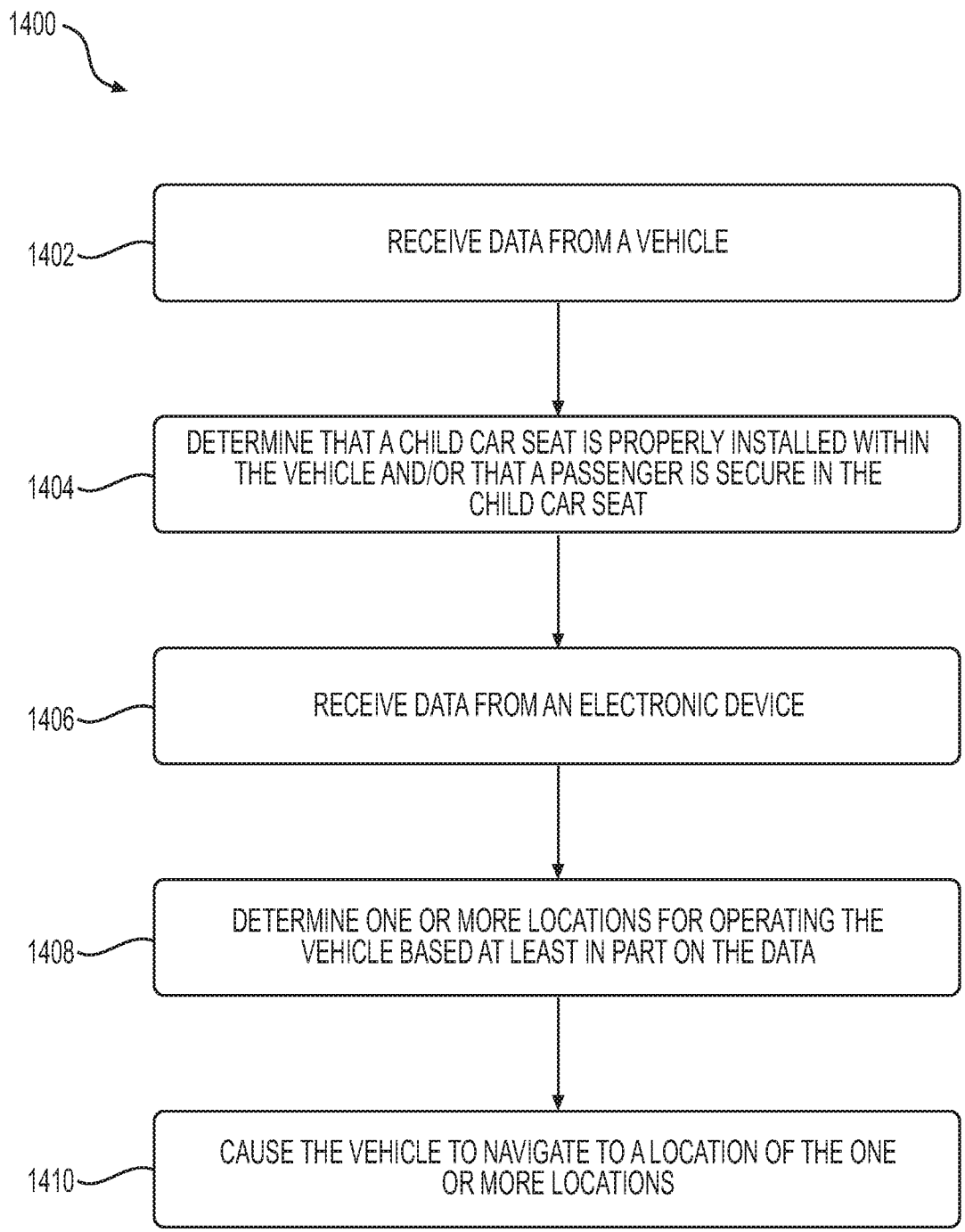
FIG. 14 illustrates a flow diagram of an example process for limiting locations that a vehicle can operate when a passenger is secure in a child car seat.

FIG. 14 illustrates a flow diagram of an example process 1400 for limiting locations that a vehicle can operate when a passenger is secure in a child car seat. At 1402, the process 1400 receives data from a vehicle and at 1404, the process 1400 determines that a child car seat is properly installed within the vehicle and/or that a passenger is secure in the child car seat. For instance, a system may continuously receive data from one or more sensors within the vehicle, where the data represents the passenger compartment of the vehicle. The system can then analyze the data to determine that the passenger is secure in the child car seat and/or that the child car seat is properly installed in the vehicle.

At 1406, the process 1400 receives data from an electronic device. For instance, the system can receive data from an electronic device associated with a user outside of the vehicle, where the user can be related to the passenger (e.g., parent). In some instances, the data can indicate a geographical location of the electronic device, and the system can continuously receive the data. In some instances, the data can indicate a threshold distance that the vehicle is able to operate while the passenger is secure in the child car seat. In some instances, the data can indicate one or more locations (e.g., roads, a parking spot) that the vehicle is authorized to operate while the passenger is secure in the child car seat.

At 1408, the process 1400 determines one or more locations for operating the vehicle based at least in part on the data and at 1410, the process causes the vehicle to navigate to a location of the one or more locations. For example, if the data indicates a geographical location of the electronic device, the system can determine an area of operation as including a threshold distance from the geographic location. The system can then determine the one or more location based on the one or more location being within the area of operation. For another example, if the data indicates the one or more locations, the system can determine the one or more location using the received data. In either example, the system can then cause the vehicle to navigate to one of the locations.

Figure 15:
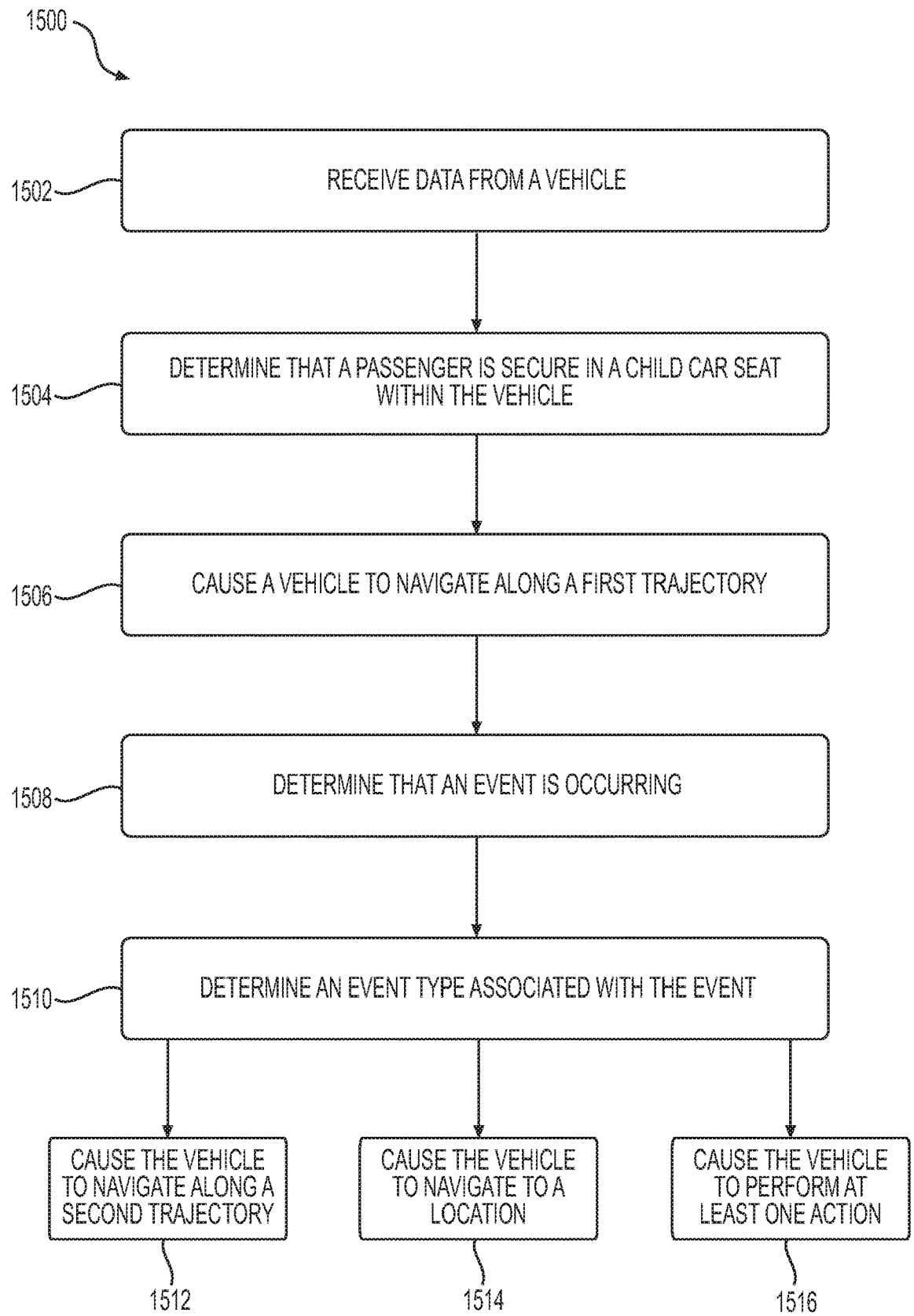
FIG. 15 illustrates a flow diagram of an example process for causing a vehicle to navigate using an alternate trajectory after detecting an event.

FIG. 15 illustrates a flow diagram of an example process 1500 for causing a vehicle to navigate an alternative trajectory based on detecting an event. At 1502, the process 1500 receives data from a vehicle and at 1504, the process 1500 determines that a child car seat is properly installed within the vehicle and/or that a passenger is secure in the child car seat. For instance, a system may continuously receive data from one or more sensors within the vehicle, where the data represents the passenger compartment of the vehicle. The system can then analyze the data to determine that the passenger is secure in the child car seat and/or that the child car seat is properly installed within the vehicle.

At 1506, the process 1500 causes the vehicle to navigate along a first trajectory and at 1508, the process 1500 determines that an event is occurring. For instance, the system can cause the vehicle to navigate from a first location to a second location along the first trajectory. While navigating, the system may receive data from the vehicle and analyze the data to determine that an event is occurring. For example, the data may include image data from at least one imaging device and/or audio data from at least one microphone within the vehicle, and the system may analyze the data to determine that the passenger is crying, screaming, and/or upset. For another example, the system may determine that it is too dangerous for the vehicle to continue navigating with the passenger, such as because bad weather is approaching.

At 1510, the process determines an event type associated with the event. For instance, the system can analyze the data received from the vehicle to determine the event type. In some instance, the event type can include a passenger event, such as the passenger crying, screaming, and/or being upset. In some instances, the event type can include a vehicle event, such as it being too dangerous for the vehicle to navigate with the passenger based on bad weather.

Based on the event type, at 1512, the process 1510 can cause the vehicle to navigate along a second trajectory. For instance, based on determining that an event is occurring, such as it being too dangerous for the vehicle to navigate with the passenger, the system can cause the vehicle to navigate along the second trajectory. In some instances, the second trajectory may be from the current location of the vehicle to a third location, where the third location may include a location in which the vehicle picked up the passenger and/or a current geographical location of the electronic device that requested the vehicle.

Additionally, based on the event type, at 1514, the process 1500 can cause the vehicle to navigate to a location. For instance, based on determining that an event is occurring, such as a passenger event or a vehicle event, the system can cause the vehicle to navigate to a location. In some instances, the location corresponds to a location in which the vehicle picked up the passenger and/or a current geographical location of the electronic device that requested the vehicle.

Furthermore, based on the event type, at 1516, the process 1500 can cause the vehicle to perform at least one action. For instance, based on a passenger event, the system can cause the vehicle to rock, vibrate, output audio to the passenger, output visual entertainment to the passenger, and/or the like.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A system comprising:
one or more processors; and
one or more computer-readable media storing instructions that, when executed by the one or more processors, cause the one or more processors to perform operations comprising:
   causing an autonomous vehicle to operate in a first mode of operation, wherein the autonomous vehicle is bidirectional and configured to navigate to a location in a first direction of travel and a second direction of travel when operating in the first mode of operation;
   receiving data associated with a passenger within the autonomous vehicle;
   determining, based at least in part on the data associated with the passenger, that the passenger is positioned in a child car seat within the autonomous vehicle;
   determining a location of the child car seat within the autonomous vehicle;
   determining a pose of the passenger within the child car seat; and
   based at least in part on the passenger being positioned in the child car seat, the location of the child car seat, and the pose of the passenger, causing the autonomous vehicle to switch from operating in the first mode of operation to a second mode of operation that improves safety of the passenger relative to the first mode of operation, wherein the second mode of operation is associated with one of: the first direction of travel or the second direction of travel.

2. The system as recited in claim 1, the operations further comprising:
determining at least one characteristic associated with the passenger, the at least one characteristic including at least one of an age of the passenger, a height of the passenger, or a weight of the passenger; and
determining to navigate the autonomous vehicle in the first direction of travel or the second direction of travel is based on the at least one characteristic.

3. The system as recited in claim 1, the operations further comprising:
receiving additional data associated with the passenger within the autonomous vehicle;
determining that an event associated with the passenger is occurring; and
causing the autonomous vehicle to navigate to the location based at least in part on the event occurring.

4. The system as recited in claim 1, the operations further comprising:
receiving, from an electronic device, data associated with media content to be output to the passenger within the autonomous vehicle; and
causing at least one media device within the autonomous vehicle to output the media content.

5. The system as recited in claim 4, wherein causing the at least one media device to output the media content comprises at least one of:
causing at least one speaker within the autonomous vehicle to output sound associated with the media content; or
causing at least one display within the autonomous vehicle to present visual content associated with the media content.

6. The system as recited in claim 1, the operations further comprising:
sending, to an electronic device located outside of the autonomous vehicle, at least a portion of the data;
receiving additional data from the electronic device, the additional data associated with at least one of an image of a user or user speech from the user; and
causing the autonomous vehicle to output content associated with the additional data.

7. The system as recited in claim 1, the operations further comprising:
receiving an indication of an area within which the autonomous vehicle is to stay while the passenger is within the autonomous vehicle; and
causing the autonomous vehicle to remain within the area.

8. The system as recited in claim 1, the operations further comprising:
receiving additional data associated with the passenger within the autonomous vehicle;
determining, based at least in part on the additional data, that an event associated with the passenger is occurring during the first mode of operation or the second mode of operation;
determining an event type associated with the event; and
causing, based at least in part on the event type, the autonomous vehicle to navigate along a trajectory to the location.

9. The system as recited in claim 1, wherein the pose identifies whether the passenger within the child car seat is rear-facing or front-facing relative to the first direction of travel.

10. A method comprising:
under control of one or more processors:
   receiving, from at least one sensor, data associated with a passenger compartment of an autonomous vehicle, wherein the autonomous vehicle is bidirectional and is configured to travel in multiple available directions of travel;
   determining, based at least in part on the data, that a passenger is positioned in a child car seat within the autonomous vehicle;
   determining a location of the child car seat within the autonomous vehicle;
   determining a pose of the passenger within the child car seat;
   determining, based at least in part on the passenger being positioned in the child car seat, the location of the child car seat within the autonomous vehicle, and the pose of the passenger, a direction of travel that improves safety relative to other of the multiple available directions of travel;
   causing the autonomous vehicle to switch from a first mode of operation to a second mode of operation, the second mode of operation associated with the direction of travel; and
   navigating in the direction of travel.

11. The method as recited in claim 10, wherein:

the direction of travel comprises a first direction of travel;

the first mode of operation is associated with the first direction of travel and a second direction of travel; and causing the autonomous vehicle to switch from operating in the first mode of operation to operating in the second mode of operation is based at least in part on determining that the passenger is positioned in the child car seat.

12. The method as recited in claim 10, further comprising:

determining at least one characteristic associated with the passenger, the at least one characteristic including at least one of an age of the passenger, a height of the passenger, or a weight of the passenger, wherein determining the direction of travel is further based on the at least one characteristic.

13. The method as recited in claim 10, further comprising:

receiving, from an electronic device, data associated with a location at which to drop off the passenger;

receiving, from the electronic device, data associated with a time period at which to drop off the passenger; and causing the autonomous vehicle to navigate to the location at the time period.

14. The method as recited in claim 10, further comprising:

determining, based at least in part on the passenger being positioned in the child car seat, an area of operation within which the autonomous vehicle is authorized to navigate and causing the autonomous vehicle to navigate within the area of operation.

15. The method as recited in claim 10, wherein the pose identifies whether the passenger within the child car seat is rear-facing or front-facing relative to a current direction of travel.

16. The method as recited in claim 10, further comprising:

determining a direction for the child car seat to face during navigation of the autonomous vehicle; and determining the direction of travel that improves safety relative to the multiple available directions of travel further based at least in part on the direction for the child car seat to face during navigation of the autonomous vehicle.

17. A system comprising one or more processors; and one or more computer-readable media storing instructions that, when executed by the one or more processors, cause the one or more processors to perform operations comprising:

receiving first data associated with a passenger within an autonomous vehicle, wherein the autonomous vehicle is bidirectional and is configured to travel in multiple available directions of travel;

determining, based at least in part on the first data associated with the passenger, that the passenger is positioned in a child car seat within the autonomous vehicle;

determining a location of the child car seat within the autonomous vehicle;

determining a pose of the passenger within the child car seat;

selecting, based at least in part on the passenger being positioned in the child car seat, the location of the child car seat within the autonomous vehicle, and the pose of the passenger, a direction of travel for the autonomous vehicle that improves safety relative to other of the multiple available directions of travel;

receiving second data associated with a geographic location, wherein the geographic location is associated with an electronic device;

determining, based at least in part on the geographic location, one or more locations to navigate the autonomous vehicle; and causing the autonomous vehicle to navigate to a location of the one or more locations using the direction of travel.

18. The system as recited in claim 17, the operations further comprising:

identifying an area of operation that is within a threshold distance from the geographic location, wherein determining the one or more locations comprises determining the one or more locations as being within the area of operation.

19. The system as recited in claim 17, the operations further comprising:

determining that at least one of the passenger is secured within the child car seat or the child car seat is secured in the autonomous vehicle, wherein causing the autonomous vehicle to navigate to the location is based on at least in part on determining that the at least one of the passenger is secured within the child car seat or the child car seat is secured in the autonomous vehicle.

20. The system as recited in claim 17, wherein before causing the autonomous vehicle to navigate to the location, the operations further comprise:

determining that at least one of the passenger is not secured within the child car seat or the child car seat is not secured in the autonomous vehicle; and suspending the autonomous vehicle from navigating to the location.

* * * * *